United States Patent [19]
Andersen et al.

[11] Patent Number: 5,654,048
[45] Date of Patent: *Aug. 5, 1997

[54] CEMENTITIOUS PACKAGING CONTAINERS

[75] Inventors: Per Just Andersen; Simon K. Hodson, both of Santa Barbara, Calif.

[73] Assignee: E. Khashoggi Industries, Santa Barbara, Calif.

[*] Notice: The term of this patent shall not extend beyond the expiration date of Pat. No. 5,543,186.

[21] Appl. No.: 486,864

[22] Filed: Jun. 7, 1995

Related U.S. Application Data

[63] Continuation of Ser. No. 19,151, Feb. 17, 1993, Pat. No. 5,453,310, which is a continuation-in-part of Ser. No. 929,898, Aug. 11, 1992, abandoned.

[51] Int. Cl.$^6$ .............................. B32B 13/02; B32B 5/02
[52] U.S. Cl. .................. 428/34.5; 428/34.7; 428/36.4; 428/36.5; 428/312.4; 428/317.9; 428/703; 206/524.1; 206/524.6; 206/524.7
[58] Field of Search ........................ 428/34.5, 35.7, 428/36.4, 36.5, 703, 34.7, 312.4, 317.9; 106/672, 675, 676, 713, 714, 726, DIG. 2; 206/524.1, 524.6, 524.7

[56] References Cited

U.S. PATENT DOCUMENTS

| | | |
|---|---|---|
| 109,669 | 11/1870 | Rowland . |
| 128,980 | 7/1872 | Rowland . |
| 591,168 | 10/1897 | Heinzerling . |

(List continued on next page.)

FOREIGN PATENT DOCUMENTS

| | | |
|---|---|---|
| 237557 | 8/1988 | Argentina . |
| 241782 A1 | 12/1992 | Argentina . |
| 241781 | 12/1993 | Argentina . |
| 0263723 A2 | 4/1988 | European Pat. Off. . |
| 0290007 A1 | 11/1988 | European Pat. Off. . |
| 0340707 A2 | 11/1989 | European Pat. Off. . |
| 0340765 A2 | 11/1989 | European Pat. Off. . |
| 0497151 A1 | 8/1992 | European Pat. Off. . |
| 2841172 | 9/1978 | Germany . |
| 3011330 | 3/1980 | Germany . |
| 47-20190 | 9/1972 | Japan . |
| 51-2729 | 1/1976 | Japan . |
| 53-16730 | 2/1978 | Japan . |
| 54-31320 | 3/1979 | Japan . |
| 54-48821 | 4/1979 | Japan . |
| 55-37407 | 3/1980 | Japan . |
| 55-100256 | 7/1980 | Japan . |
| 56-17965 | 2/1981 | Japan . |
| 58-120555 | 7/1983 | Japan . |
| 62-36055 | 8/1985 | Japan . |
| 62-36056 | 8/1985 | Japan . |
| 60-260484 | 12/1985 | Japan . |
| 60-264375 | 12/1985 | Japan . |
| 62-253407 | 4/1986 | Japan . |
| 62-39204 | 2/1987 | Japan . |
| 62-46941 | 2/1987 | Japan . |

(List continued on next page.)

OTHER PUBLICATIONS

S. P. Shah *Recent Trends In the Science and Technology of Concrete*, NSF Center for Advanced Cement–Based Materials, Northwestern University, Evanston, Illinois, pp. 1–18 (no date).

Nakano et al., *Cement Compositions Suitable for Extrusion Molding of High–Strength Building Materials* Chemical Abstracts, vol. 115, p. 314 (1991).

ACBM, *Cementing the Future*, vol. 6, No. 1, Spring 1994.

Alexanderson, *Self–Smoothing Floors Based on Polymer Cement Concrete*, Concrete International (Jan. 1990).

Algnesberger, *The Use of Anionic Melamine Resin as a Concrete Additive*, Cement Lime and Gravel (Sep. 1973).

Andersen,*Control and Monitoring of Concrete Production–A Study of Particle Packing and Rheology*, The Danish Academy of Technical Sciences (1990).

Andersen, *Effect of Organic Superplasticizing Admixtures and Their Components on Zeta Potential and Related Properties of Cement Materials*, Master of Science thesis, Pennsylvania State University (1987).

Andersen, *Effects of W/C–Ratio and Dispersion on the Pore Size Distribution of Cement Paste and Concrete*, Paper prepared for MRL by Per Just Anderson (Aug. 1988).

Andersen, Per Just, Ph.D., *Rheology of Cement Paste Mortar and Concrete* (no date).

Andersen, et al., *Tailoring of Cement–Bound Materials By the Use of Packing and Rheological Models*, American Ceramic Society (1988).

Andersen, *Tailoring of Concrete Materials*, R&H Annual Review (1988).

(List continued on next page.)

Primary Examiner—Marion E. McCamish
Assistant Examiner—Blaine R. Copenheaver
Attorney, Agent, or Firm—Workman, Nydegger & Seeley

[57] ABSTRACT

Cementitious containers which have a cementitious structural matrix for use in the packaging, storing, partitioning, and/or shipping of goods. The containers are manufactured from cementitious materials in order to be strong, durable, tough, lightweight, cushioning, insulative, inexpensive, and more environmentally compatible than those currently used in packaging, storing, and/or shipping goods. The cementitious structural matrix of the containers includes a hydraulic cement paste (formed from the reaction of water with, e.g., a portland cement) in combination with a rheology-modifying plasticizer, such as methylhydroxyethylcellulose. Preferred embodiments may also in include various aggregate materials, fibrous materials, and air voids, which add the necessary strength while making the product lightweight, and which can provide insulative properties (if desired) at a cost which is economically justified in comparison to conventional paper and polystyrene products. The molded cementitious mixtures generally have sufficient strength in the green (or uncured) state to maintain their molded shape. The cementitious mixtures can be formed into flat sheets having greatly varying thicknesses depending upon the intended use of the container. Corrugated sheets can be made to increase the container strength.

74 Claims, No Drawings

U.S. PATENT DOCUMENTS

| | | |
|---|---|---|
| 882,538 | 3/1908 | Sargent . |
| 1,223,834 | 4/1917 | Sanger . |
| 1,234,692 | 7/1917 | Poznanski . |
| 1,427,103 | 8/1922 | Haenicke et al. . |
| 1,874,974 | 8/1932 | Hammenecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler et al. . |
| 2,700,615 | 1/1955 | Heijmer et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,959,489 | 11/1960 | Wagner . |
| 3,006,615 | 10/1961 | Mason, Jr. . |
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,117,014 | 1/1964 | Klug . |
| 3,149,986 | 9/1964 | Zelmanoff . |
| 3,169,877 | 2/1965 | Bartoli et al. . |
| 3,215,549 | 11/1965 | Ericson . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,403,205 | 9/1968 | Ottenholm . |
| 3,432,317 | 3/1969 | Kelly et al. . |
| 3,459,632 | 8/1969 | Caldwell et al. . |
| 3,468,993 | 9/1969 | Bierlich . |
| 3,470,005 | 9/1969 | Flachsenberg et al. . |
| 3,492,385 | 1/1970 | Simunic . |
| 3,520,707 | 7/1970 | Steinberg et al. . |
| 3,526,172 | 9/1970 | Stuart . |
| 3,558,070 | 1/1971 | Gabriels . |
| 3,579,366 | 5/1971 | Rehmar . |
| 3,683,760 | 8/1972 | Silva . |
| 3,689,294 | 9/1972 | Brannauer . |
| 3,697,366 | 10/1972 | Harlock et al. . |
| 3,745,891 | 7/1973 | Bodendoerfer . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,773,700 | 11/1973 | Eash et al. . |
| 3,806,571 | 4/1974 | Ronnmark et al. . |
| 3,819,389 | 6/1974 | Uchikawa et al. . |
| 3,824,107 | 7/1974 | Weiant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,954,490 | 5/1976 | Cockram . |
| 3,968,004 | 7/1976 | Coffey et al. . |
| 3,979,217 | 9/1976 | Sutton . |
| 3,989,534 | 11/1976 | Plunguian et al. . |
| 3,998,651 | 12/1976 | Baudouin et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits et al. . |
| 4,040,851 | 8/1977 | Ziegler . |
| 4,043,862 | 8/1977 | Roberts . |
| 4,046,584 | 9/1977 | Snyder et al. . |
| 4,053,346 | 10/1977 | Amberg et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,077,809 | 3/1978 | Plunguian et al. . |
| 4,084,980 | 4/1978 | Motoki . |
| 4,085,001 | 4/1978 | Fukuwatari . |
| 4,093,690 | 6/1978 | Murray . |
| 4,115,135 | 9/1978 | Goeman . |
| 4,117,059 | 9/1978 | Murray . |
| 4,117,060 | 9/1978 | Murray . |
| 4,121,402 | 10/1978 | Cress et al. . |
| 4,132,555 | 1/1979 | Barrable . |
| 4,133,619 | 1/1979 | Wise . |
| 4,135,940 | 1/1979 | Peltier . |
| 4,149,550 | 4/1979 | Green et al. . |
| 4,157,998 | 6/1979 | Berntsson et al. . |
| 4,158,989 | 6/1979 | Barr . |
| 4,159,302 | 6/1979 | Greve et al. . |
| 4,185,923 | 1/1980 | Bouette et al. . |
| 4,187,768 | 2/1980 | Suzuki . |
| 4,188,231 | 2/1980 | Valore . |
| 4,190,454 | 2/1980 | Yamagisi et al. . |
| 4,196,161 | 4/1980 | Toffolom et al. . |
| 4,202,857 | 5/1980 | Lowe . |
| 4,209,336 | 6/1980 | Previte . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,229,225 | 10/1980 | Kraszewski et al. . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,244,781 | 1/1981 | Heckman . |
| 4,257,710 | 3/1981 | Delcoigne et al. . |
| 4,257,814 | 3/1981 | Kellet et al. . |
| 4,261,754 | 4/1981 | Krenchel et al. . |
| 4,264,367 | 4/1981 | Schutz . |
| 4,264,368 | 4/1981 | Schutz . |
| 4,272,198 | 6/1981 | Velikov et al. . |
| 4,279,695 | 7/1981 | Winterbottom . |
| 4,287,247 | 9/1981 | Reil et al. . |
| 4,299,790 | 11/1981 | Greenberg . |
| 4,305,758 | 12/1981 | Powers et al. . |
| 4,310,996 | 1/1982 | Mulvey et al. . |
| 4,313,997 | 2/1982 | Ruff et al. . |
| 4,326,891 | 4/1982 | Sadler . |
| 4,353,748 | 10/1982 | Birchall et al. . |
| 4,362,679 | 12/1982 | Malinowski . |
| 4,370,166 | 1/1983 | Powers et al. . |
| 4,373,957 | 2/1983 | Pedersen . |
| 4,378,271 | 3/1983 | Hargreaves et al. . |
| 4,383,862 | 5/1983 | Dyson . |
| 4,406,703 | 9/1983 | Guthrie et al. . |
| 4,410,366 | 10/1983 | Birchall et al. . |
| 4,415,366 | 11/1983 | Copening . |
| 4,423,112 | 12/1983 | Luthringshauser et al. . |
| 4,427,610 | 1/1984 | Murray . |
| 4,428,741 | 1/1984 | Westphal . |

| | | |
|---|---|---|
| 4,428,775 | 1/1984 | Johnson et al. . |
| 4,444,593 | 4/1984 | Schutz . |
| 4,445,970 | 5/1984 | Post et al. . |
| 4,452,596 | 6/1984 | Clauss et al. . |
| 4,460,348 | 7/1984 | Iioka et al. . |
| 4,462,835 | 7/1984 | Car . |
| 4,481,037 | 11/1984 | Beale et al. . |
| 4,490,130 | 12/1984 | Konzal et al. . |
| 4,497,662 | 2/1985 | Chisholm et al. . |
| 4,504,315 | 3/1985 | Allemann et al. . |
| 4,508,595 | 4/1985 | Gasland . |
| 4,522,772 | 6/1985 | Bevan . |
| 4,524,828 | 6/1985 | Sabins et al. . |
| 4,529,653 | 7/1985 | Hargreaves et al. . |
| 4,529,662 | 7/1985 | Lancaster et al. . |
| 4,529,663 | 7/1985 | Lancaster et al. . |
| 4,533,393 | 8/1985 | Neuschaeffer et al. . |
| 4,536,173 | 8/1985 | Puls . |
| 4,545,854 | 10/1985 | Gomez et al. . |
| 4,549,930 | 10/1985 | Dessauer . |
| 4,551,384 | 11/1985 | Aston et al. . |
| 4,552,463 | 11/1985 | Hodson . |
| 4,562,218 | 12/1985 | Fornadel et al. . |
| 4,571,233 | 2/1986 | Konzal . |
| 4,581,003 | 4/1986 | Ito et al. . |
| 4,585,486 | 4/1986 | Fujita et al. . |
| 4,588,443 | 5/1986 | Bache . |
| 4,613,627 | 9/1986 | Sherman et al. . |
| 4,619,636 | 10/1986 | Bogren . |
| 4,621,763 | 11/1986 | Brauner . |
| 4,622,026 | 11/1986 | Ito et al. . |
| 4,623,150 | 11/1986 | Moehlman et al. . |
| 4,636,345 | 1/1987 | Jensen et al. . |
| 4,637,860 | 1/1987 | Harper et al. . |
| 4,640,715 | 2/1987 | Heitzmann et al. . |
| 4,642,137 | 2/1987 | Heitzman et al. . |
| 4,650,523 | 3/1987 | Kikuchi et al. . |
| 4,655,981 | 4/1987 | Nielsen et al. . |
| 4,673,438 | 6/1987 | Wittwer et al. . |
| 4,680,023 | 7/1987 | Varano . |
| 4,707,187 | 11/1987 | Tsuda et al. . |
| 4,710,422 | 12/1987 | Fredenucci . |
| 4,746,481 | 5/1988 | Schmidt . |
| 4,749,444 | 6/1988 | Lorz et al. . |
| 4,753,710 | 6/1988 | Langley et al. . |
| 4,754,589 | 7/1988 | Leth . |
| 4,755,494 | 7/1988 | Ruben . |
| 4,772,439 | 9/1988 | Trevino-Gonzalez . |
| 4,784,693 | 11/1988 | Kirkland et al. . |
| 4,786,670 | 11/1988 | Tracy et al. . |
| 4,789,244 | 12/1988 | Dunton et al. . |
| 4,797,161 | 1/1989 | Kirchmayr et al. . |
| 4,799,961 | 1/1989 | Friberg . |
| 4,836,940 | 6/1989 | Alexander . |
| 4,840,672 | 6/1989 | Baes . |
| 4,842,649 | 6/1989 | Heitzman et al. . |
| 4,872,913 | 10/1989 | Dunton et al. . |
| 4,888,059 | 12/1989 | Yamaguchi et al. . |
| 4,889,428 | 12/1989 | Hodson . |
| 4,892,589 | 1/1990 | Kirkland et al. . |
| 4,895,598 | 1/1990 | Hedberg et al. . |
| 4,912,069 | 3/1990 | Ruben . |
| 4,919,758 | 4/1990 | Wagle et al. . |
| 4,921,250 | 5/1990 | Ayres . |
| 4,923,665 | 5/1990 | Andersen et al. . |
| 4,925,530 | 5/1990 | Sinclair et al. . |
| 4,927,043 | 5/1990 | Vanderlaan . |
| 4,927,573 | 5/1990 | Alpár et al. . |
| 4,939,192 | 7/1990 | t'Sas . |
| 4,944,595 | 7/1990 | Hodson . |
| 4,948,429 | 8/1990 | Arfaei . |
| 4,952,278 | 8/1990 | Gregory et al. . |
| 4,963,603 | 10/1990 | Felegi, Jr. et al. . |
| 4,975,473 | 12/1990 | Kaneda et al. . |
| 4,976,131 | 12/1990 | Grims et al. . |
| 4,979,992 | 12/1990 | Bache . |
| 4,983,257 | 1/1991 | Schultz et al. . |
| 4,985,119 | 1/1991 | Vinson et al. . |
| 4,999,056 | 3/1991 | Rasmussen . |
| 5,017,268 | 5/1991 | Clitherow et al. . |
| 5,018,379 | 5/1991 | Shirai et al. . |
| 5,021,093 | 6/1991 | Beshay . |
| 5,030,282 | 7/1991 | Matsuhashi et al. . |
| 5,039,003 | 8/1991 | Gordon et al. . |
| 5,039,378 | 8/1991 | Pommier et al. . |
| 5,039,560 | 8/1991 | Durgin et al. . |
| 5,047,086 | 9/1991 | Hayakawa et al. . |
| 5,051,217 | 9/1991 | Alpár et al. . |
| 5,061,346 | 10/1991 | Taggart et al. . |
| 5,071,512 | 12/1991 | Bixler et al. . |
| 5,076,986 | 12/1991 | Delvaux et al. ............... 264/122 |
| 5,085,366 | 2/1992 | Durgin et al. . |
| 5,085,707 | 2/1992 | Bundy et al. . |
| 5,089,186 | 2/1992 | Moore et al. . |
| 5,089,198 | 2/1992 | Leach . |
| 5,102,596 | 4/1992 | Lempfer et al. . |
| 5,104,487 | 4/1992 | Taggart et al. . |
| 5,106,423 | 4/1992 | Clarke . |
| 5,106,880 | 4/1992 | Miller et al. . |
| 5,108,677 | 4/1992 | Ayres . |
| 5,108,679 | 4/1992 | Rirsch et al. . |
| 5,110,413 | 5/1992 | Steer . |
| 5,122,231 | 6/1992 | Anderson . |
| 5,126,013 | 6/1992 | Wiker et al. . |
| 5,126,014 | 6/1992 | Chung . |
| 5,132,155 | 7/1992 | Singh et al. . |
| 5,134,179 | 7/1992 | Felegi, Jr. et al. . |
| 5,141,797 | 8/1992 | Wheeler . |
| 5,151,130 | 9/1992 | Croft et al. . |
| 5,154,771 | 10/1992 | Wada et al. . |
| 5,156,718 | 10/1992 | Neubert . |
| 5,160,676 | 11/1992 | Singh et al. . |
| 5,167,894 | 12/1992 | Baumgarten . |
| 5,169,566 | 12/1992 | Stucky et al. . |
| 5,178,730 | 1/1993 | Bixler et al. . |
| 5,184,995 | 2/1993 | Kuchenbecker . |
| 5,221,435 | 6/1993 | Smith, Jr. . |
| 5,232,496 | 8/1993 | Jennings et al. . |
| 5,240,561 | 8/1993 | Kaliski . |
| 5,273,821 | 12/1993 | Olson et al. . |
| 5,290,355 | 3/1994 | Jakel . |
| 5,338,349 | 8/1994 | Farrar . |
| 5,366,549 | 11/1994 | Imaizumi . |

FOREIGN PATENT DOCUMENTS

| | | |
|---|---|---|
| 62-151304 | 7/1987 | Japan . |
| 63-00551 | 1/1988 | Japan . |
| 63-00552 | 1/1988 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 63-310780 | 12/1988 | Japan . |
| 64-37478 | 2/1989 | Japan . |
| 2-51460 | 2/1990 | Japan . |
| 2-141484 | 5/1990 | Japan . |
| 2-190304 | 7/1990 | Japan . |
| 3-80141 | 4/1991 | Japan . |
| 3-153551 | 7/1991 | Japan . |
| 3-187962 | 8/1991 | Japan . |
| 3-202310 | 9/1991 | Japan . |
| 3-202313 | 9/1991 | Japan . |
| 3-208847 | 9/1991 | Japan . |
| 4-70304 | 3/1992 | Japan . |

| | | |
|---|---|---|
| 453555 | 1/1936 | United Kingdom . |
| 490820 | 8/1938 | United Kingdom . |
| 2086748 | 5/1982 | United Kingdom . |
| 2050459 | 6/1983 | United Kingdom . |
| 2192392 | 1/1988 | United Kingdom . |
| 2220934 | 1/1990 | United Kingdom . |
| 2265916 | 10/1993 | United Kingdom . |
| WO 87/00828 | 2/1987 | WIPO . |
| WO 91/12186 | 8/1991 | WIPO . |
| WO 93/20990 | 10/1993 | WIPO . |

OTHER PUBLICATIONS

Attwood, *Paperboard, in the Wiley Encyclopedia of Packaging Technology*, 500–506 (Marilyn Bakker ed., 1986).

Ashby, *Materials Selection in Engineering Design*, Indian Journal of Technology, vol. 28 (Jun.–Aug. 1990).

Ashby, *Overview No. 80: On the Engineering Properties of Materials*, Acta Metall, vol. 3, No. 5, 1273–1293 (1989).

Bach, *Cement–Based Products Processed the Plastic Way* (no date).

Bache, *Densified Cement/Ultra–Fine Particle–Based Materials*, Presented at the Second International Conference on Superplasticizers in Concrete, in Ottawa, Canada (Jun. 10–12, 1981).

Bailey, *Flexural Strength of Cements*, Nature, vol. 292, 2 (Jul. 1981).

Bajza, *On The Factors Influencing the Strength of Cement Compacts*, Cement and Concrete Research, vol. 2, 67–78 (1972).

Balaguru, et al., *Flexural Behavior of Slurry Infiltrated Fiber Concrete (SIFCON) Made Using Condensed Silica Fume* (no date).

Bardsley, *Form/Fill/Seal, Horizontal, in The Wiley Encyclopedia of Packaging Technology*, 364–367 (Marilyn Bakker ed., 1986).

Baum, et al., *Paper, in Kirk–Othmer Concise Encyclopedia of Chemical Technology*, 834–836 (Martin Grayson ed., 1985).

Bernis Company, *Bags, Paper, in the Wiley Encyclopedia of Packaging Technology*, 36–39 (Marilyn Bakker ed., 1986).

Benbow, et al., *The Extrusion Mechanics of Pastes–the Influence of Paste Formulation on Extrusion Parameters*, Chemical Engineering Science, vol. 42, No. 9, 2151–2162 (1987).

Berger, et al., *Acceleration of Hydration of Calcium Silicates by Carbon Dioxide Treatment*, Nature Physical Sciences, vol. 240 (Nov. 6, 1972).

Blaha, *Ideas in Concrete*, Concrete Products (Sep. 1992).

Bohrer, *Cartons, Folding in The Wiley Encyclopedia of Packaging Technology*, 146–152 (Marilyn Bakker ed., 1986).

Bousum, *Carriers, Beverage, in the Wiley Encyclopedia of Packaging Technology*, 129–132 (Marilyn Bakker ed., 1986).

Brady, et al., *Materials Handbook*, 588–594 (1991).

Brown, et al., *An Investigation of a High Speed Shear Mixer on Selected Pastes and Mortars*, Mat. Res. Soc. Symp. Proc vol. 137(1989).

Bukowski, et al., *Reactivity and Strength Development of $CO_2$ Activated Non–Hydraulic Calcium Silicates*, Cement and Concrete Research, vol. 9, 57–68 (1979).

Clauson–Kaas, *Opsprojtet Glasfiberton i Byggeriet* (1987). (See Statement of Relevance as there is no English translation).

Clauson–Kaas, *Ekstrudering of Fiberbeton–delrapport*, Teknologisk Institut, Byggeteknik, Dec. 1986, English Translation–*Extrusion of Fiber Concrete–interim report*, Technological Institute of Denmark, Department of Building Technology, Dec. 1986.

Collepardi, et al., *Combined Effect of Lignosulfate and Carbonate on Pure Portland Clinker Compounds Hydration I. Tetracalcium Aluminoferrite Hydration*, Cement ans Concrete Research, vol. 10, 455–462 (1980).

Collepardi, et al., *Influence of Polymerization of Sulfonated Naphthalene Condensate and its Interaction with Cement* (no date).

Davidson, et al., *Water–Soluble Resins*, New York; Reinhold Publishing Corp., Chapman & Hall, Ltd., London (no date).

Devlin, et al., *Waxes, in the Wiley Encyclopedia of Packaging Technology*, 697–700 (Marilyn Bakekr ed., 1986).

Dow Plastics, *Thermoforming Process Guide* (no date).

Eriksen et al., *Foam Stability Experiment on Solutions Containing Superplasticizing and Air–entraining Agents for Concrete*, The Technological Institute, Department of Building Technology, Taastrup, Denmark (no date).

Eubanks, *Cans, Composite, in The Wiley Encyclopedia of Packaging Technology*, 94–98 (Marilyn Bakker ed., 1986).

Ferretti, *Distributed Reinforcement Concrete Pipe: An Innovative Product*, MRS, 44–48 (May 1993).

Fordos, *Natural or Modified Cellulose Fibres as Reinforcement in Cement Composites*, Concrete Technology & Design vol. 5, Natural Fiber Reinforced Cement and Concrete (1988).

Greminger, Jr., et al., *Alkyl and Hydroxyalkylalkylcellulose*, Dow Chemical U.S.A., Midland Oregan.

Gresher, *Carded Packaging, in The Wiley Encyclopedia of Packaging Technology*, 124–129 (Marilyn Bakker ed., 1986).

Hanlon, *Fibre Tubes, Cans, and Drums, in Handbook of Package Engineering*, 7–1 to 7–15 (2d ed. 1984).

Hewlett, *Physico–Chemical Mechanisms of Admixtures Lecture*, CGLI Advanced Concrete Technology Course, Cement and Concrete Association Training Centre (1975).

Hlavac, *The Technology of Ceramics*, Glass Science and Technology, 4: The Technology of Glass and Ceramics, Elsevier Publishing (1983).

Hyland, *F–Flute Inches Its Way Into Folding Carton Market*, Paperboard Packaging, at 28–29 (May 1993).

Iler, *The Chemistry of Silica*, 430–432 (1979).

Johansen, et al., *Particle Packaging and Concrete Properties*, Materials Science of Concrete II, 111–147 (no date).

Jones, et al., *Raw Materials Processing*, Ceramics: Industrial Processing and Testing, Iowa State University Press (1972).

Kaye, *Adhesives, in The Wiley Encyclopedia of Packaging Technology*, 14–16 (Marilyn Bakker ed., 1986).

Klieger, *Studies of the Effect of Entrained Air on the Strength and Durability of Concretes Made with Various Maximum Sizes of Aggregate*, Research and Development Laboratories of the Portland Cement Association (Oct. 1952).

Kline, *Corrugating Operations and Raw Materials in Paper and Paperboard: Manufacturing and Converting Fundamentals*, 184–195 (2d ed. 1991).

Kline, *Packaging in Paper and Paperboard: Manufacturing and Converting Fundamentals*, 196–211 (2d ed. 1991).

Kline, *Paper and Paperboard Manufacturing and Converting Fundamentals*, 19–28 (2d ed. 1982).

Knab, et al., *Effects of Maximum Void Size and Aggregate Characteristics on the Strength of Mortar*, Cement and Concrete Research, vol. 13, 383–390 (1983).

Knudsen, *On Particule Size Distribution in Cement Hydration*, Presented to the 7th International Congress on the Chemistry of Cement, Paris (1980).

Kohn, et al., *Cans Fabrication*, in The Wiley Encyclopedia of Packaging Technology, 100–108 (Marilyn Bakker ed., 1986).

Laenger, *Designing an Extruder with Allowance for the Properties of Ceramic Extrusion Compounds–Part 1*, cfi/Ber. DKG 67, No. 4 (1990).

Laenger, *Extruderauslegung unter Berucksichtingung . . . English Translation–Designing an Extruder with Allowance for the Properties of Ceramic.*, Part 2a, cfi/Ber. DKG 68, No. 9 (1991).

Laenger, *Extruderauslegung unter Berucksichtingung . . . English Translation–Designing an Extruder with Allowance for the Properties of Ceramic. . . Part 2b*, cfi/Ber. DKG 68, No. 10/11 (1991).

Laenger, *Extruderauslegung unter Berucksichtingung . . . English Translation–Designing an Extruder with Allowance for the Properties of Ceramic . . . Part 3*, cfi/Ber. DKG 69, No. 3 (1992).

Laenger, *Extruderaulsegung unter Berucksichtingung . . . English Translation–Designing an Extruder with Allowance for the Properties of Ceramic . . . Part 4a*, cfi/Ber. DKG 69, No. 7/8 (1992).

Laenger, *Extruderaulsegung unter Berucksichtingung . . . English Translation–Designing an Extruder with Allowance for the Properties of Ceramic . . . 4b*, cfi/Ber. DKG 69, No. 9 (1992).

Laenger, *Extruderauslegung unter Berucksichtingung . . . English Translation–Designing an Extruder with Allowance for the Properties of Ceramic . . . Part 5a*, cfi/Ber. DKG 69, 10 (1992).

Laenger, *Extruderauslegung unter Berucksichtingung . . . English Translation–Designing an Extruder with Allowance for the Properties of Ceramic . . . Part 5b*, DKG 70, No. 3 (1993).

Lavin, *Cans, Composite, Self–manufactured*, in The Wiley Encyclopedia of Packaging Technology, 98–100 (Marilyn Bakker ed, 1986).

Lawrence, *The Properties of Cement Paste Compacted Under High Pressure: Research Report 19*, Cement and Concrete Association Research Report 19 (Jun. 1969).

Leaversuch, *Blowing Agents: Products Minimize Tradeoffs as CFC Phase–out Takes Effect*, Modern Plastics (1993).

Lecznar, et al., *Strength of Neat Cement Pastes Molded Under Pressure*, Journal of the American Concrete Institute Concrete Briefs (Feb. 1961).

Lentz, *Printing*, in The Wiley Encyclopedia of Packaging Technology, 554–559 (Marilyn Bakker ed., 1986).

Lewis, et al., *Microstructure–Property Relationships in Macro–Defect–Free Cement*, MRS Bulletin (Mar. 1993).

Lewis, Sr., *Condensed Chemical Dictionary*, 870 (12th ed. 1993).

Lisiecki, *Cartons, Gabletop*, in The Wiley Encyclopedia of Packaging Technology, 152–154 (Marilyn Bakker ed., 1986).

Litvan, et al., *Particulate Admixture for Enhanced Freeze–Thaw Resistance of Concrete*, Cement and Concrete Research, vol. 8, 53–60, Pergamon Press, Inc. (1978).

Lynch, et al., *Boxes, Rigid–Paperboard*, in The Wiley Encyclopedia of Packaging Technology, 76–79 (Marilyn Bakker ed., 1986).

Manson, et al., *Use of Polymers in Highway Concrete*, National Cooperative Highway Research Program Report 190 (1978).

Maries, *The Activation of Portland Cement by Carbon Dioxide* (no date).

Mass, *Premixed Cement Paste*, Concrete International (Nov. 1989).

Maycock, et al., *Carbonation of Hydrated Calcium Silicates*, Cement and Concrete Research, vol. 4, 69–76 (1974).

Miyake, et al., Sakai, *Superplasticized Concrete Using Refined Lignosulfate and its Action Mechanism*, Cement and Concrete Research, vol. 15 (1985).

Moyer, *Form/Fill/Seal, Vertical*, in The Wiley Encyclopedia of Packaging Technology, 367–369 (Marilyn Bakker ed., 1986).

Naaman, et al., *Tensile Stress–Strain Properties of SIFCON*, ACI Materials Journal (May–Jun. 1989).

Niel, *Supplementary Paper II–117. The Influence of Alkali–Carbonate on the Hydration of Cement* (1968).

Purton, *The Effect of Sand Grading on the Calcium Silicate Brick Reaction*, Cement and Concrete Research vol. 4, 13–29 (1974).

Putnam, et al., *Papermaking Additives*, in Kirk–Othmer Concise Encyclopedia of Chemical Technology, 836–437 (Martin Grayson ed., 1985).

Radeck, *Closure Liners*, in The Wiley Encyclopedia Packaging Technology, 171–172 (Marilyn Bakker ed., 1986).

Robinson, *Extrusion Defects* (no date).

Rosenberg, et al., *A New Mineral Admixture for High–Strength Concrete–Proposed Mechanism for Strength Enhancement*, Second International Conference on the Use of Fly Ash, Silica Fume, Slag and Natural Pozzolans in Concrete (Apr. 21–25, 1986).

Roy, *New Strong Cement Materials: Chemically Bonded Ceramics*, Science, vol. 235, 6 (Feb. 1987).

Roy, et al., *Processing of Optimized Cements and concretes via Particle Packaging*, MRS Bulletin (Mar. 1993).

Roy, et al., *Very High Strength Cement Pastes Prepared by Hot Pressing and Other High Pressure Techniques*, Cement and Concrete Research, vol. 2, 349–366 (1972).

Satas, *Coating, Equipment*, in The Wiley Encyclopedia of Packaging Technology, 186–191 (Marilyn Bakker ed., 1986).

Sciaudone, *Boxes, Rigid–Plastics*, in the Wiley Encyclopedia of Packaging Technology, 78–79 (Marilyn Bakker ed., 1986).

Shilstone, Sr., *Mix Temperature and $$$$$*, Concrete Producer News (Oct. 1989).

Shilstone, Sr., *Concrete Mixture Optimization by Coarseness Factor, Mortar Factor & Particle Distribution*, Concrete International (Dec. 1989).

Shilstone, Sr., *Mixture Optimization for Fast–Track*, Report for American Concrete Institution Convention, San Diego, CA (no date).

Sikora, *Paper*, The Wiley Encyclopedia of Packaging Technology, 497–500 (Marilyn Bakker ed., 1986).

Skalny, et al., *Low Water to Cement Ratio Concretes*, Cement and Concrete Research, vol. 3, 29–40 (1973).

Skalny, et al., *Properties of Cement Pastes Prepared by High Pressure Compaction*, ACI Journal, Mar. (1970).

Soroushian, et al., *Recycling of Wood and Paper in Cementitious Materials*, Mat. Res. Soc. Symp. Proc., vol. 266 (1992).

Stix, *Concrete Solutions*, Scientific American (Apr. 1993).

Strabo, et al., *Cementbaserede Hybridkompositte*, Teknologisk Institut, Byggeteknik, TT–Projekt 1985–133/177–85.533 (1987).

Strabo, et al., *Ekstrudering at Fiberbeton*, Teknologisk Institut, Byggeteknik, TR–Projekt 1985–133/177–85.538 (Oct. 1987).

*English Translation*–Strabo, et al., *Extrusion of Fiber Concrete*, Danish Technolgical Institute, Department of Building Technology, TR–Project 1985–133/177–85.538 (Oct. 1987).

Strabo, et al., *Fiberbeton Teknologi Teknologisk*, Institut, Byggeteknik, TR–Project 133/177–82.042 (1986).

*English Translation*–Strabo, et al., *Fiber Concrete Technology*, Technological Institute of Denmark, Department of Building Technology, TR–Project 133/117–82.042 (1986).

Strabo, et al., *Nye Formgivningsmetoder til Fiberbeton*, Teknologisk Institut, Byggeteknik, TR–Projekt 1984–133/117–84.028 (Apr. 1987).

*English Translation*–Strabo, et al., *New Design Methods for Fiber Concrete*, Technological Institute of Denmark, Department of Building Technology, TR–Project 1984–133/117–84.028 (Apr. 1987).

Studt, *New Advances Revive Interest In Cement–Based Materials*, R&D Magazine (Nov. 1992).

Sun, et al., *The Composition of Hydrated DSP Cement Pastes* (no date).

Sutherland, *Air–Entrained Concrete*, Cement and Concrete Association, Cement and Concrete Association (1970).

Suzuki, et al., *Formation and Carbonation of C–S–H In Water*, Cement and Concrete Research, vol. 15, 213–224 (1985).

Swec, *Boxes, Corrugated*, in The Wiley Encyclopedia of Packaging Technology, 66–76 (Marilyn Bakker ed., 1986).

Swientek, *Formidable Films*, Prepared Foods, at 118–121 (Sep. 1993).

Unwalla, et al., editors, *Recycled Materials for Making Concrete*, The Indian Concrete Journal, vol. 53, No. 9 (Sep. 1979).

Verbeck, *Carbonation of Hydrated Portland Cement*, Cement and Concrete Special Technical Publication No. 203 (1958).

Vrana, *Khashoggi Kin Reported Planning Private Placement of Shares in New Container Firm*, (Mar. 28, 1993).

Wagner, *Polymer Modification of Portland Cement Systems*, Chemtech (Feb. 1973).

Waldman, *Molded Pulp*, in The Wiley Encyclopedia of Packaging Technology, 559–561 (Marilyn Bakker ed., 1986).

Westman, et al., *The Packaging of Particles* (1930).

Weiss, et al., *High Tensile Cement Pastes as a Low–Energy Substitute for Metals, Plastics, Ceramics, and Wood. Phase 1: Preliminary Technological Evaluation*, CTL Project CR7851–4330, Final Report, Prepared for U.S. Dept. of Energy (Nov. 1984).

Young, et al., *Introduction to MDF Cement Composites*, ACBM vol. 1, No. 2 (Fall 1989).

Young, *Macro–Defect–Free Cement: A Review*, Mat. Res. Soc. Symp. Proc., vol. 179 (1991).

Yudenfreund, et al., *Hardened Portland Cement Pastes of Low Porosity, II. Exploratory Studies Dimensional Changes*, Cement and Concrete Reseach, vol. 2, 331–348 (1972).

Zukowski, et al., *Rheology of Cementitious Systems*, MRS Bulletin (Mar. 1993).

*The Coating Process for Paper* (1993).

*The Colcrete Process*, (Undated Publication).

*Doing More With Less Optimizing Concrete Mix*, Better Roads (Aug. 1990).

*Flexible Packages in Modem Packaging Encyclopedia and Planning Guide*, 114–126 (Gross et al. eds., 2d ed. 1972).

*Fiberbeton–nyt*, Teknologisk Institut, Byggeteknik, Blad nr. 1 (Oct. 1987).

*English Translation–Fiber Concrete News*, The Technological Institute of Denmark, Department of Building Technology, Pamphlet No. 1 (Oct. 1987).

*Labeling and Printing in Modem Packaging Encyclopedia and Planning Guide*, 193–214 (Gross et al. eds., 2d 1972).

*Materials*, in Modem Packaging Encyclopedia and Planning Guide 54–113 (Gross et al., eds., 2d ed. 1972).

*Nye Metoder I Beton Kan Betyde Teknisk Knock–Out for Plast*, Ingenioren, Saertryk fra nr, 14/86 (1986).

*English Translation–New Method for Concrete May Mean Technical Knock–Out for Plastics*, The Engineer, No. 14 (1986).

*Plastic–Forming Processes* (no date).

*Report of the Panel on Solids Processing* (no date).

*Rigid and Semirigid Containers*, in Modem Packaging Encyclopedia and Planning Guide, 127–192 (Gross et al., eds., 2d ed. 1972).

*Shipping and Protection*, in Modem Packaging Encyclopedia and Planning Guide, 215–240 (Gross et al., eds., 2d ed. 1972).

*Space–Age Concrete That May Sub for Steel* (no date).

*Zien In The Food Industry*, Freeman Industries, Inc. (no date).

CEMENTITIOUS PACKAGING CONTAINERS

This application is a continuation of application Ser. No. 08/019,151, filed Feb. 17, 1993, now issued U.S. Pat. No. 5,453,310, which is a continuation in part of U.S. Ser. No. 07/929,888, filed Aug. 11, 1992, now abandoned.

BACKGROUND OF THE INVENTION

1. The Field of the Invention

The present invention relates to novel cementitious materials and their methods of manufacture, and more particularly, cementitious containers that are lightweight, inexpensive, waterproof, sometimes insulative, and environmentally neutral. Both disposable and reusable cementitious containers are disclosed.

2. Related Applications

This application is a divisional of co-pending application Ser. No. 08/019,151, entitled "Cementitious Materials for Use in Packaging Containers and Their Methods of Manufacture" and filed Feb. 17, 1993, in the names of Per Just Andersen, Ph.D., and Simon K. Hodson, now issued as U.S. Pat. No. 5,453,310, which is a continuation-in-part of co-pending application Ser. No. 07/929,898, entitled "Cementitious Food and Beverage Storage, Dispensing, and Packaging Containers and the Methods of Manufacturing Same" and filed Aug. 11, 1992, in the names of Per Just Andersen, Ph.D., and Simon K. Hodson (now abandoned).

3. The Relevant Technology

Advanced packaging techniques allow for all types of products to travel safely for long distances from their point of origin, even with lengthy and time-consuming distribution systems. Packaging containers protect their contents from environmental influences and distribution damage. They also provide a medium for the dissemination of information to the consumer; for example, product specification, ingredients, product weight, advertising, brand identification, and pricing.

Specifically, packaging containers protect items from two major destructive influences: chemical and physical. Chemical destruction relates to compositional changes resulting from a product's exposure to moisture, light, microorganisms, or gases. Although not strictly a chemical problem, packaging also provides a barrier against vermin, including rodents and insects. On the other hand, protecting against physical destruction includes restricting the physical contents of the goods, cushioning against shock and vibration encountered during distribution, and preventing the items from leaking or being crushed.

Paper manufacturing companies are spending millions of dollars to find the "perfect" package. Recently, Georgia-Pacific Corporation opened a new package technology and development center where boxes are designed on computer screens which are connected to large cutting tables that automatically shape and perforate the cardboard for testing under many different simulated actual and artificial conditions. Businesses are demanding packaging strong enough to protect their products, light enough to make shipping cheaper, and made of recyclable materials. The amount of time spent in research and development to meet these needs is indeed staggering.

Since nearly every product must be packaged for shipping and sale, the anticipated use of packaging containers is certainly on the increase. For example, the Congressional Office of Technology Assessment predicted in 1989 that the amount of corrugated boxes manufactured annually will increase by more than ten percent through 2000. This same report states that even the amount of packaging materials used in importing goods amounts to about 2.5 million tons per year.

The standard box or carton used in shipping is made of cardboard or a similar paper product. When insulation is required, styrofoam is typically preferred because of insulation capabilities, cost, and stability. Protective packing material is typically made from paper or plastic, e.g., styrofoam or other polystyrene-type materials. Every year, 5.6 billion tons of plastic packaging are produced.

Recently, with the public's attention being focused on environmental issues, certain containment products have come under heavy scrutiny, especially disposable packing materials and boxes. Most notably subject to criticism have been styrofoam products, which typically require the use of chloro-fluorocarbons (or "CFC's") in their manufacture, as well as use of vast amounts of the ever shrinking petroleum reserves.

Unfortunately, CFC's have been linked to the destruction of the ozone layer, because they release chlorine products into the stratosphere. It is mainly because of their stability that they do not soon degrade after being first emitted. This allows them to migrate upward through the atmosphere until they reach the ozone layer in the stratosphere. Upon disintegration, it is thought that CFC's release chlorine, which is readily converted to chlorine monoxide.

The second North American National Ozone Expedition (NOZE II) and the international Airborne Antarctic Ozone Experiment, which sent planes into the ozone hole in October 1987, found strong correlations between levels of chlorine monoxide and ozone depletion. In March 1988, the Ozone Trends Panel released an analysis showing that ozone loss has been considerably greater than computer models had predicted. The panel concluded that from 1969 to 1986, ozone levels had dropped 1.7 to 3% in the latitude band 30° to 64° N, which covers most of the United States, Europe, the Soviet Union, and China. Wintertime depletion in the northern portion of this region was even more severe, being 5 to 6%.

Because the ozone layer acts as a filter that removes the most harmful ultraviolet ("UV") wavelengths emitted by the sun, it is believed that significant thinning may, in the future, cause widespread damage to living organisms through excessive exposure to harmful UV light.

In particular, excessive exposure to UV radiation causes sunburning of the skin of humans and animals, in addition to the burning of the retina. One of the most recent "ozone holes" was reported over the southern tip of South America and over parts of North America. There have been reports of animals in Tierra del Fuego, the southernmost region of Chile and Argentina, having developed blindness and cataracts far in excess compared to times past. There have been numerous studies and reports that have concluded that further breakdown of the ozone layer will lead to sharp increases in skin cancer and cataracts in humans.

In the manufacture of foams, including styrofoam (or blown polystyrene), CFC's (which are highly volatile liquids) are used to "puff" or "blow" the polystyrene which is then molded into the foam cups and other food containers or packing materials. In particular, CFC-12 has been the agent of choice, but was among the CFC's slated to be phased out of use.

In the interim, polystyrene manufacturers in the U.S. have been turning to HCFC-22 as a replacement for CFC-12. While less ozone-depleting than CFC-12, HCFC-22 is still implicated nevertheless. As a result, in the early 1990's, some companies have started to use pentane in the foaming process of plastics. Nevertheless, pentane is also very hazardous to the environment; further, recent studies have suggested that pentane is more easily transferred from the plastic to the product when used in a container.

As a result, there has been widespread clamor for companies to return to using more environmentally safe and low cost containers. Some environmentalists have even favored a ream to more extensive use of paper products instead of polystyrene, if only because it is thought by some that paper represents the lesser of two evils. Nevertheless, although paper products have not been linked to the destruction of the ozone layer and are biodegradable, recent studies have shown that paper more strongly impacts the environment than does styrofoam in other respects. In fact, the wood pulp and paper industry is one of the top five polluters in the United States.

In response to intense pressure by environmentalists to find a substitute for polystyrene "peanuts," which have been the packing material of choice by many in the shipping industry, Quill (the largest office supply mail-order company in the United States) tested alternatives such as paper and real popcorn. It concluded that polystyrene peanuts were superior to either of these two alternatives.

Quill's research determined that, compared to plastic, paper filler (1) takes up more space in landfills, (2) deteriorates after several recyclings, (3) is heavier, (4) taxes resources such as trees and water, and (5) releases contaminants as it degrades. As for popcorn, Quill determined that it (1) crumbles, (2) leaves a residue, (3) attracts pests, and (4) diverts farmland from food production.

Other studies have shown that where polystyrene and paper are compared head-to-head in similar products, paper is far more damaging to the environment. Although it should be noted that different studies have produced differing statistics, one study showed that products made from paper require 10 times as much steam, 14 to 20 times as much electricity, and twice as much cooling water, compared to an equivalent polystyrene product. The same study showed that the effluent from paper-making contains 10 to 40 times the amount of contaminants produced in the manufacture of polystyrene foam. Other studies have put the figure at 10 to 100.

In addition, although most containment products made from paper contain mostly unbleached paper, to the extent bleached paper is used for such purposes, the environment is impacted by a dangerous toxin produced as a by-product of paper bleaching: dioxin. Dioxin, or more accurately, 2,3,7,8-tetrachlorodibenzo[b,e][1,4]dioxin, is a highly toxic, teragenic contaminant, and is extremely dangerous even in very low quantities.

Toxic effects of dioxin in animals include anorexia, severe weight loss, hepatotoxicity, hematoporphyria, vascular lesions, chloracne, gastric ulcers, teratogenicity, and premature death. Industrial workers exposed to dioxin have frequently developed chloracne, porphyrinuria, and porphyria cutanea tarda. Most experts in the field believe that dioxin is a carcinogen.

The highest levels of dioxin found in discharge waters from paper mills are about 0.5 part per trillion. However, fish found downstream from paper pulp mills can contain nearly 200 parts per trillion of dioxin, with levels of 50 parts per trillion being not uncommon. Typical concentrations of dioxin in bleached paper products range from undetectable amounts up to about 10 parts per trillion.

Further, it is forgotten that it is often necessary to coat many paper containers with a wax or plastic material in order to give it waterproofing properties. Moreover, if insulative properties are necessary, even more drastic modifications to the paper material in the container are necessary.

As mentioned above, many types of plastic containers, as well as the coatings utilized with paper containers, are derived from fossil fuels, mainly petroleum, and share many of the environmental concerns of petroleum refinement and the petrochemical industry, which need not be repeated here.

In addition to the obvious chemical hazards of paper, plastic, and polystyrene production, an additional problem is the impact of these containers on municipal waste disposal systems throughout the country. Both polystyrene and plastics used in food containers are very slow to degrade. This is especially true when buffed deep inside of landfills, and away from the corrosive effects of light, air, and water.

Similarly, although paper is touted as biodegradable, it has been known to last a remarkably long time buffed deep in a municipal dump; there are reports of telephone books being lifted from garbage that had been buried for decades. This longevity of paper is further complicated since it is common to treat, coat, or impregnate the paper with various organic materials.

The Congressional Office of Technology Assessment estimated that as of October 1989 approximately 55% by volume (and almost one-half by weight) of the materials in landfills are paper and paper products, and this percentage is steadily growing. Even after recycling, paper and paperboard products comprise the largest category of materials in municipal waste facilities. Other studies show that plastic accounts for up to 20% of the waste in landfills by volume, and that figure may nearly double to 40% by the year 2000. These figures clearly indicate the impact of current packing materials on waste management. Incineration could reduce these amounts, but incineration is often the source of significant airborne pollution, especially when plastics and polystyrene products are incinerated. Even paper, which burns relatively cleanly, emits $CO_2$ (which has been implicated as a greenhouse gas) as well as dioxin.

About the only effective way to reduce the shear volume of traditional container and packing wastes is through recycling. However, recycling is not without its contribution of large amounts of pollution into the environment in the form of fuel spent in transporting recyclables to recycling centers, as well as fuels and chemicals used in the recycling process itself.

In short, what are needed are containers used in packaging, storing, and shipping which do not require the wholesale cutting of trees in order to supply the necessary raw materials. In addition, it would be a significant advancement in the art to provide packaging containers which are more environmentally neutral, which do not require the use ozone-depleting chemicals, which do not contain hazardous chemicals like dioxin, or which do not create unsightly garbage that does not or is very slow to degrade. Moreover, it would be an even greater improvement over the prior art if such containers did not result in the contamination of the packaged goods by any of the other toxic chemical which are often put into paper.

It would be a significant advancement to provide containers which have the cushioning and insulative properties of styrofoam, but which do not contribute to the depletion of the ozone layer. Further, it would be significant that such containers and packing materials be lightweight and yet give sufficient structural support for containing, partitioning, or cushioning products therein.

From a practical point of view, such containers must necessarily be produced inexpensively at costs comparable to existing products. From a manufacturing perspective, it would be a significant advancement in the art to provide containers which can be rapidly formed while maintaining their shape outside of a mold or other external support so that they can be handled quickly after formation.

Finally, it would be a completely novel and important advancement if such containers had a chemical composition compatible with the earth into which they eventually might be disposed.

Such packaging containers are disclosed and claimed herein.

BRIEF SUMMARY AND OBJECTS OF THE INVENTION

The present invention encompasses packaging containers made from hydraulic cement and appropriate aggregates and additives, and the methods for their manufacture. It has been found that lightweight, cushioning, insulative, and environmentally compatible containers can be readily and inexpensively manufactured from cementitious materials through innovative processes developed through a microstructural engineering design approach. Containers within the scope of the present invention are particularly useful for packaging, storing, and shipping any goods which are typically packaged, stored, or shipped in the traditional cardboard box.

Hydraulic cement products and the methods of utilizing various hydraulic cements have literally been known for millennia. The types of such cementitious products which have been made over the centuries are various and numerous. However, these products are similar in that they are extremely bulky, requiring significant mass in order to achieve the desired strength and other performance criteria.

While some lightweight cementitious products have been made (in industries other than the packaging container industries), these products have not been able to achieve the desired high strength (or other important property) to mass ratio at effective and practical costs. As a result, the present invention was developed from the perspective of microstructural engineering in order to build into the microstructure of the cementitious composition the desired properties while at the same time remaining cognizant of costs and manufacturing complications. This microstructural engineering analysis approach, instead of the traditional trial-and-error mix and test approach, has resulted in the ability to design the cementitious materials with those properties of strength, weight, insulation, cost, and environmental concerns that are necessary for appropriate containers.

The cementitious structural matrix of the containers disclosed herein include a hydraulic cement paste (formed from, e.g., a portland-type cement) in combination with a rheology-modifying agent (sometimes referred to herein as a "plasticizer"), such as methylhydroxyethylcellulose. The preferred embodiment further includes various aggregate materials, fibrous materials, and air voids which add the necessary strength, and if needed, insulative properties at a cost which is economically justified. Suitable rheology modifying agents, which will be discussed in greater detail below, include cellulose, starch, and protein based materials and their derivatives, and certain synthetic organic materials.

The preferred methods of manufacturing containers for packaging, storing, and shipping within the scope of the present invention include the steps of (1) mixing a powdered hydraulic cement and water in order to form a cement paste; (2) combining a rheology-modifying agent (such as methylhydroxyethylcellulose) with the cement paste such that resultant cementitious mixture develops a more plastic-like rheology; (3) adding an aggregate or other material to the cementitious mixture in order to impart the desired lightweight properties to the mixture; (4) adding a fibrous material, preferably with a high aspect ratio, to the cementitious mixture to impart compressive, tensile, flexural, and purchase strength; (5) extruding or molding the cementitious mixture into either a predetermined shape of the container or a flat sheet which is later shaped into a container; and (6) allowing the cementitious mixture to harden in the predetermined shape. The flat sheet can be formed into the shape of a container and then cured, or allowed to cure and then formed into the shape of a container.

Additional embodiments of the present invention include the addition of air voids in order to add cushioning and/or insulative properties to the containers. These air voids are created by the incorporation of gas through various techniques into the cementitious mixture during the mixing process.

The compositions of the present invention can be varied to yield products of substantially different character. For example, very lightweight products (similar to that of styrofoam) with rigid walls can be manufactured; for convenience, this type of product is sometimes herein referred to as a "foam-type" product. In addition to rigid containers, flexible containers having a cementitious matrix which includes plastic particles can be made. Such flexibility can be general in cases where the plastic particles are evenly dispersed, or localized on the surface in cases where the plastic particles are concentrated near the container surface.

Alternatively, products which have an appearance more like that of a pottery or ceramic product can be made according to the present invention; however, the products of the present invention are much lighter, typically having a bulk specific gravity less than 2.0, and usually less than 1.0, whereas pottery or ceramic products typically have a bulk specific gravity of 2.0 or greater. This type of product is sometimes herein referred to as a "clay-type" product.

Yet other cementitious containers may have characteristics that are similar to both "foam-type" and "clay-type" products. These hybrid products are referred to as "foam-clay" products and are similarly lightweight.

Finally, containers having multiple (at least two) layers of cementitious materials having different densities, rigidities, and other properties can be made. For example, such containers can be rigid on the outer surface, giving the container the ability to withstand forces typically associated with the shipping or storage of goods, yet be soft on the inner surface to protect and cushion the goods being shipped or stored.

Although lightweight containers are often desired, certain applications may require a very high cement content (up to 100% cement by weight), such as where dry pressed cement is hydrated after it is pressed. In such cases, the bulk specific gravity might be higher than 2.0.

A key feature of the microstructural engineering design of the present invention is the cost optimization of each of the component materials. Further, in the preferred embodiment the mixing is performed under high shear conditions in order to create a substantially homogeneous cementitious mixture of all of the components.

The molding process can be done by a variety of well known methods which have historically been applied to plastic materials, including high pressure extrusion, roller casting, passing the cementitious material through a pair of rollers; ram pressing, hot isostatic pressing, injection molding, and other casting and forming methods. While these methods are known in the art in connection with plastics and some ceramic and metal powdered materials, it is only because of the unique microstructural engineering of the present invention that the cementitious mixture can be molded into a product (such as a container) and maintain its shape without external support during the green state until curing can occur.

Indeed, the economic viability of manufacturing processes for containers from cementitious materials is only possible because the cementitious mixture is self-supporting during the green state and will maintain its molded state throughout the curing process. In addition, the compositions of the present invention importantly provide a cementitious mixture that rapidly reaches a sufficiently high strength that the molded containers can be handled and manipulated.

From the foregoing, it will be appreciated that an object of the present invention is the development of cementitious containers for packaging, storing, and shipping which do not require the use of environmentally damaging methods or resources in order to supply the necessary raw materials.

Further, another object and feature of the present invention is the development of cementitious containers which are more environmentally neutral, which do not use environmentally harmful chemicals in their manufacture, and which do not create unsightly garbage which does not or very slowly degrades.

Yet another object and feature of the present invention is the development of cementitious containers which do not contain or result in the release during manufacture of hazardous chemicals like dioxin. Moreover, such containers do not result in the contamination of the packaged goods by any of the other toxic chemical which are often put into paper.

A still further object and feature of the present invention is the development of cementitious containers which have the insulating and cushioning properties of materials such as styrofoam, but without the disadvantages outlined above.

Another object and feature of the present invention is the development of cementitious containers which are lightweight and yet have a high strength to bulk density ratio to give sufficient structural support for the container involved.

Still another object and feature of the present invention is the development of cementitious containers which can be produced inexpensively at costs comparable to existing products.

A still further object and feature of the present invention is the development of cementitious containers which will maintain their shape without external support during the green state and rapidly achieve sufficient strength that the molded containers can be handled.

Finally, another object and feature of the present invention is the development of cementitious containers which have essentially the same chemical composition as the earth into which they eventually will be disposed.

These and other objects and features of the present invention will become more fully apparent from the following description and appended claims, or may be learned by the practice of the invention as set forth hereafter.

DETAILED DESCRIPTION OF THE PREFERRED EMBODIMENTS

The present invention relates to containers for use in packaging, storing, or shipping of any product for which traditional materials are used, such as cardboard boxes, styrofoam packing materials, and any other objects such as partitions, liners, or lids used therewith. More particularly, the present invention is directed to containers manufactured from cementitious materials that are generally lightweight and have a high strength to bulk density ratio, can be cost effectively produced, are insulative, and are more environmentally neutral than currently used packaging, storing, or shipping materials.

As discussed above, the containers within the scope of the present invention can be made to have a variety of densities and physical characteristics. "Foam-type," "clay-type", and "foam-clay" products can be manufactured depending upon the concentrations and types of the materials used and the molding, casting, or extrusion process utilized. Hence, the specific properties or qualities desired for any product can be engineered by proper selection of the components and manufacturing processes as taught herein.

I. General Discussion.

A. Microstructural Engineering Design.

As mentioned above, the containers of the present invention have been developed from the perspective of microstructural engineering in order to build into the microstructure of the cementitious composition the desired properties while at the same time remaining cognizant of costs and manufacturing complications. This microstructural engineering analysis approach, instead of the traditional trial-and-error mix and test approach, has resulted in the ability to design the cementitious materials with those properties of strength, weight, cost, insulation, and environmental concerns that are necessary for appropriate containers.

The number of materials available to engineer a specific product is enormous—estimates range between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have high modula, while polymers have low modula; metals can be shaped by casting and forging, while composites require lay-up or special molding techniques; cements have high flexural strength, while elastomers have low flexural strength.

However, this compartmentalization has its dangers; it can lead to specialization (the metallurgist who knows nothing of ceramics) and to conservative thinking ("we use steel because that is what we have always used"). It is this specialization and conservative thinking that has limited the consideration of using cementitious materials for a variety of products, such as in connection with the packaging industry. Nevertheless, once it is realized that cementitious materials have such a wide utility and can be designed and microstructurally engineered, then their applicability to a variety of possible products becomes obvious.

The design of the compositions of the present invention have been developed and narrowed, first by primary constraints dictated by the design, and then by seeking the subset of materials which maximize the performance of the components. At all times during the process, however, it is important to realize the necessity of designing products which can be manufactured by a cost-competitive process.

Primary constraints in materials selection are imposed by characteristics of the design of a component which is critical to a successful product. With respect to a container, those primary constraints include minimal weight, strength, and toughness requirements while keeping the costs to those comparable to paper, cardboard, or polystyrene counterparts. In addition, other restraints include creating cementitious materials which are adequately flexible and which possess adequate cushioning ability.

Obviously, one of the problems with cementitious materials in the past has been that typical cement mixtures are poured into a form, worked, and then allowed to set and cure over a long period of time, typically days or weeks. Experts generally agree that it takes at least one month for concrete products to reach a substantial degree of their optimum strength, but they also admit that most concrete products do not reach their maximum strength for several decades. Such time periods are certainly impractical for disposable products.

As a result, a critical feature of the present invention is that when the cementitious mixture is molded, it will maintain its shape (i.e., support its own weight subject to minor forces) in the green state without external support. Further, from a manufacturing perspective, in order for economical production, it is important that the molded container rapidly (in a matter of minutes) achieve sufficient strength so that it can be handled, even though the cementitious mixture may still be in a green state.

Another advantage of the microstructural engineering approach of the present invention is that it is possible to develop a composition in which cross-sections of the structural matrix are more homogeneous than have been typically achieved in the prior art. Ideally, when any two given cross-sections of about 1–2 mm$^2$ of the cementitious structural matrix are taken, they will have substantially similar mounts of voids, aggregates, fibers, and any other additives or properties of the matrix.

It will be appreciated that many of the components utilized in the present invention have been utilized at one time or another in a concrete-type product; however, they have not been used in combination to give the properties and qualities obtained herein. Furthermore, it is significant that the present invention is able to obtain these properties and qualities at an economical cost. In other words, even if a lightweight concrete product has been produced, it has not been produced at a cost which makes the commercialization of the product possible because of the specific components and processes used.

From the following discussion, it will be appreciated how each of the component materials in the cementitious mixture works to meet the primary design constraints. Specific materials and compositions are set forth in the examples to demonstrate how the maximization of the performance of each component accomplishes the combination of desired properties.

B. Containers.

The terms "container" or "containers" as used in this specification and the appended claims are intended to include any receptacle or vessel utilized for packaging, storing, or shipping items, whether such use is intended to be short term or long term. Examples of such containers include boxes, cups, jars, spherical objects, bottles, cartons, cases, crates, or other types of holders. In short, the "container" should be capable of being moved while maintaining the integrity of the materials contained therein. This does not mean that the container is required to be used in shipping goods, or that it must be capable of withstanding the forces often encountered when goods are actually shipped from one location to another. The container should, however, be capable of containing the goods when lifted and placed in another location. It will be appreciated that under certain circumstances the container may seal the contents from the external atmosphere and in other circumstances may merely hold or retain the items.

In addition to integrally formed cementitious containers, containment products used in conjunction with noncementitious containment materials are also included within the term "containers." Such other containers include, for example, lids, liners, partitions, wrappers, cushioning materials, and any other object used in packaging, storing, or shipping goods, or wrapping an object held within a container.

The containers within the purview of the present invention may or may not be classified as being disposable. In some cases, where a stronger, more durable construction is required, the container might be capable of repeated use. On the other hand, the container might be manufactured in such a way so as to be economical for it to be used only once and then discarded and to have a construction such that it can be readily discarded or thrown away in conventional waste landfill areas as an environmentally neutral material (without causing significant extraordinary environmental hazards).

The present invention may include certain types of cementitious containers such as those discussed in U.S. Pat. No. 5,100,586, entitled "Cementitious Hazardous Waste Containers and Their Method of Manufacture." This patent discloses and claims cementitious containers for the storage of hazardous waste. For purposes of disclosure, the above-identified patent is incorporated herein by specific reference. Such hazardous waste containers can be spherical with a hollow core.

C. Hydraulic Cement-Based Materials.

The compositions and methods of the present invention involve the use of the family of cements known as hydraulic cements. A hydraulic cement is characterized by inorganic cements which form hydration reaction products when combined with water. Hydraulic cements are to be distinguished from other cements such as polymeric organic cements.

1. Hydraulic Cements.

Terms such as "powdered hydraulic cement," as used in this specification and the appended claims, are intended to include clinker, crushed, ground, and milled clinker in various stages of pulverizing and in various particle sizes. Examples of typical hydraulic cements known in the art include: the broad family of portland cements (including ordinary portland cement without gypsum), calcium aluminate cements (including calcium aluminate cements without set regulators, e.g., gypsum), plasters, silicate cements (including β-dicalcium silicates, tricalcium silicates, and mixtures thereof), gypsum cements, phosphate cements, high alma cements, microfine cements, slag cements, magnesium oxychloride cements, and aggregates coated with micro fine cement particles.

The term "hydraulic cement" is also intended to include other cements known in the art, such as α-dicalcium silicate, which can be made hydraulic under hydrating conditions within the scope of the present invention. The basic chemical components of the hydraulic cements within the scope of the present invention usually include $CaO$, $SiO_2$, $Al_2O_3$, $Fe_2O_3$, $MgO$, $SO_3$, or a combination thereof. These react together in a series of complex reactions to form insoluble silicates, carbonates (from $CO_2$ in the air and added water), sulfates, hydrates, and other salts or products of calcium and magnesium. The aluminum and iron constituents are thought to be incorporated into elaborate complexes within the abovementioned insoluble salts. The cured cement product is a complex matrix of insoluble hydrates and salts which are complexed and linked together much like stone, and are similarly inert.

Hydraulic cement compositions are typically formed by mixing powdered hydraulic cement and water; this mixture is commonly referred to as "cement paste." The hydraulic cement and water are mixed either simultaneously or subsequently, with some sort of aggregate blended to form a "cementitious mixture." Mortar and concrete are examples of cementitious mixtures formed by mixing hydraulic cement, water, and some sort of aggregate, such as sand or rock.

The terms "hydraulic cement compositions" or "cement-based compositions," as used herein, are intended to broadly define compositions in terms of hydration. In the preferred embodiments of the present invention, the hydraulic cement compositions include materials incorporating a cement which are in the hydration state at a time prior to the initial set of the hydraulic cement paste. It is also intended that the term "hydraulic cement compositions" shall include cement paste, cementitious mixtures, and final cementitious or concrete products.

The present invention may include other types of hydraulic cement compositions such as dry pressed cement compositions discussed in copending patent application Ser. No. 07/981,615, filed Nov. 25, 1992 now U.S. Pat. No. 5,358,676, in the names of Hamlin M. Jennings, Ph.D., Per Just Andersen, Ph.D., and Simon K. Hodson and entitled "Hydraulically Bonded Cement Compositions and Their Methods of Manufacture and Use," wherein powdered hydraulic cement is placed in a near net final position and compacted prior to the addition of water for hydration. For purposes of disclosure, the above-identified patent application is incorporated herein by specific reference.

Additional types of hydraulic cement compositions include those wherein carbon dioxide is mixed with hydraulic cement and water. This type of hydraulic cement compositions is known for its structural integrity and is discussed in copending patent application Ser. No. 07/418,027 filed Oct. 10, 1989, now U.S. Pat. No. 5,232,496, in the names of Hamlin M. Jennings, Ph.D. and Simon K. Hodson, and entitled "Process for Producing Improved Building Material and Product Thereof." In this patent application, water and hydraulic cement are mixed in the presence of a carbon source selected from the group consisting of carbon dioxide, carbon monoxide, carbonate salts, and mixtures thereof. For purposes of disclosure, the above-identified patent application is incorporated herein by specific reference.

The hydraulic cements which are preferably used in the present invention include white cement, portland cement, microfine cement, high alumina cement, and slag cement. These cements have been chosen because of their low cost—the main consideration of the present invention being to achieve a low cost, economically feasible container. However, this list is in no way exhaustive, or in any way intended as limiting the types of cements which would be useful in making the cementitious containers described herein. Many other types of cement would work equally well in the present invention, and such cements can be readily identified from comparison with the properties and attributes discussed herein with respect to the exemplary hydraulic cements.

It is obvious that an important criterion for certain embodiments of the present invention is that the container not be water soluble. Unfortunately, many of the materials that might be desirable for incorporation into such containers do dissolve in water. One of the very advantageous properties of the use of cement is that the cement particles coat the aggregates and other materials added to the cement. Hence, an otherwise soluble component can be incorporated into the cementitious mixture and its advantageous properties and characteristics can be utilized in the final product and yet be made insoluble in water.

2. Cement Paste.

In each application within the present invention, the cement paste is the constituent which eventually gives the container the ability to set up and develop strength properties. The term "cement paste" is used herein to refer to cement which has been hydrated by the addition of water. In most instances the cement paste is made by mixing together the cement and water before the molding process. However, in some cases it may be desired to dry press the cement, or the cement and various aggregates or other additives, into the shape of the final product, after which the cement is hydrated into a "cement paste" under conditions of controlled humidity (preferably 100% humidity and/or in the presence of steam).

The term "cementitious mixture" is used to refer to a cement paste to which aggregate, fiber, or other material has been added, whether in the green state (i.e., uncured) or after it has solidified and/or cured. It is composed of an amorphous mass comprising the various products within the original hydraulic cement. All of the other ingredients serve the purpose of altering the properties of the final product, including, but not limited to, strength, shrinkage, flexibility, insulating ability, color, porosity, surface finish, and texture.

The percentage of hydraulic cement within the overall mixture varies depending on the identity of the other added constituents. However, hydraulic cement is preferably added in an amount ranging from between about 5% to about 90% as a percentage by weight of the wet cementitious mixture. From the disclosure and examples set forth herein, it will be understood that this wide range of weights corresponds to situations where the volume of the hydraulic cement in the cementitious mixture may vary from 1% or less to more than 99% of the volume of the cementitious mixture.

It will be appreciated from the foregoing that embodiments within the scope of the present invention will vary from a very lightweight "foam-type" product to a somewhat heavier "clay-type" product. Hence, the amount of the various components will vary depending upon the specific product to be made.

Generally, the preferred amount of hydraulic cement in the "foam-type" products will be within the range of from about 5% to about 60% by weight of the wet cementitious mixture, and most preferably within the range from about 10% to about 30%. The amount of cement within the "foam-clay" products will generally be the same as for the "foam-type" products. With respect to the "clay-type" products, the amount of hydraulic cement will be preferably within the range from about 5% to about 95% by weight of the wet cementitious mixture, more preferably within the range from about 10% to about 50%, and most preferably within the range from about 20% to about 35% by weight.

Despite the foregoing, it will be appreciated that all concentrations and amounts are critically dependent upon the qualities and characteristics that are desired in the final product. For example, in a very thin-walled structure where strength is needed, it may be more economical to have a very high percentage of cement with little or no aggregate. A thicker panel of material within the scope of the present invention can be made of a mixture of essentially hydraulic cement and water which has been foamed so that a large amount of air is entrained in the mixture. Such a material may be particularly useful as a cushioning material.

Conversely, in a product in which high amounts of air are incorporated, such as a light packaging material, there may be a much greater percentage of the rheology-modifying agent, only a very small amount of cement, and little or no aggregates or fibers. Such materials can literally be as light as the lightest styrofoam products. Other products may be of similar compositions except that a significant amount of aggregates or fibers may be added to provide desirable strength characteristics to the resultant material.

It is important that the water to cement ratio be carefully controlled in order to result in a cementitious mixture that is self-supporting in the green state. The amount of water to be used is dependent upon a variety of factors, including the type of cement, aggregates, fibers, and other materials or additives to the cementitious mixture, the relative concentrations of each of the material components, the molding or forming process to be used, and the specific product to be made and its properties.

Nevertheless, in typical compositions within the scope of the present invention the water to cement ratio will generally fall within the range from about 0.1 to about 10. This range is broad because it cover both "foam-type" and "clay-type" products. In the case where the cement or cement mixed with aggregates or other additives is hydrated by highly humid (100%) air, the water to cement ratio can be as low as within the range from about 0.02 to about 0.15.

Specifically, "foam-type" products will preferably have a water to cement ratio within the range from about 0.5 to about 6, and most preferably within the range from about 1 to about 3. On the other hand, "clay-type" products will preferably have a water to cement ratio within the range from about 0.1 to about 3, and most preferably, within the range from about 1 to about 2. (When the water to cement ratio in the "clay-type" is high, the rheology-modifying agent is probably providing much of the binding and strength characteristics to the cementitious material.)

According to the presently contemplated best mode of the present invention, it has been found desirable that the cement and water be mixed in a high energy shear mixer such as that disclosed and claimed in U.S. Pat. No. 4,225,247 entitled "Mixing and Agitating Device" and U.S. Pat. No. 4,552,463 entitled "Method and Apparatus for Producing a Colloidal Mixture."

For purposes of understanding such high energy mixers and their methods of use, the disclosures of the aforesaid U.S. Pat. No. 4,225,247 and No. 4,552,463 are incorporated herein by specific reference. High energy mixers within the scope of these patents are available from E. Khashoggi Industries of Santa Barbara, Calif. The use of such a high energy mixer during the mixing process results in a homogeneous cement paste which has been shown to result in a product with higher strength. Furthermore, these high energy mixers can be utilized to entrain significant mounts of air into the cementitious mixture to create "foam-type" products.

D. Rheology-Modifying Agents.

As discussed above, an aspect of the present invention is the inclusion of a rheology-modifying agent which acts to increase the plastic characteristics of the cementitious mixture. For this reason, the rheology-modifying agent is sometimes referred to as a "plasticizer" because it functions to artificially introduce plasticity into the cementitious material so that it will "flow" like clay during a molding, casting, or extrusion process.

There are a variety of natural and synthetic organic plasticizers which may be used in the present invention depending on the particular application. This is because organic plasticizers have a wide range of viscosities and solubilities in water, as well as other distinguishing properties. For example, where it is desirable for the container to more quickly break down into environmentally benign components, it may be preferable to use a rheology-modifying agent which is more water soluble. Conversely, where the container will sustain prolonged exposure to water, it may be preferable to use a rheology-modifying agent which is virtually insoluble in water.

The various organic plasticizers contemplated in the present invention can be roughly organized into the following categories: polysaccharides and derivatives thereof, proteins and derivatives thereof, and synthetic organic materials. Polysaccharide plasticizers can be further subdivided into cellulose based materials and derivatives thereof, starch based materials and derivatives thereof, and other polysaccharides.

Suitable cellulose based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and cannot be listed here. Nevertheless, many other cellulose materials have the same or similar properties as these and are equivalent.

Suitable starch based materials include, for example, amylopectin, amylose, sea-gel, starch acetates, starch hydroxyethyl ethers, ionic starches, long-chain alkylstarches, dextrins, amine starches, phosphate starches, dialdehyde starches, and polyvinyl dextrin.

Other natural polysaccharide based rheology-modifying agents include, for example, alginic acid, phycocolloids, agar, gum arabic, guar gum, locust bean gum, gum karaya, and gum tragacanth.

Suitable protein based rheology-modifying agents include, for example, Zein® (a prolamine derived from corn), collagen derivatives extracted from animal connective tissue such as gelatin and glue, and casein (the principal protein in cow's milk). Another natural rheology-modifying agent which is neither a polysaccharide or a protein is latex. In addition to imparting a rheology-modifying effect when hydrated, latex may also impart some degree of binding to the cured material.

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, and ethylene oxide polymers.

A currently preferred rheology-modifying agent is methylhydroxyethylcellulose. An example of such a product is Tylose® FL 15002—a product available from Hoechst Aktiengesellschaft located in Frankfurt, Germany. Although a methylhydroxyethylcellulose rheology-modifying agent is preferred, almost any nontoxic plasticizer (including any organic plasticizer listed above) which imparts the same or similar properties as Tylose® would be appropriate.

Closely related compounds include carboxymethylcellulose, hydroxyethylcellulose, and other cellulose derivatives. Other suitable rheology-modifying plasticizing agents include any of the polysaccharide, starch, or protein based or synthetic plasticizers listed above. Other suitable rheology-modifying agents include synthetic clays (such as LAPONITE® which is available from Laporte Industries Ltd. in the United Kingdom).

As indicated, the purpose of the rheology-modifying agent is to thicken the cementitious material and to add lubrication in order to introduce plasticity into the cementitious material. Accordingly, in a presently preferred embodiment, a combination of two different types of methylhydroxyethylcellulose is often utilized. Tylose® FL 15002 (which, in a 2% solution in water, gives a viscosity of 15,000 millipascals) acts as a flocculent to aid in the binding of the cementitious material; this results in a more sticky material that looks somewhat like clay. In addition, Tylose® 4000 is used to act like a lubricant to aid in the flowing of the cementitious material during the molding, casting, or extrusion process.

Another preferred rheology-modifying agent that can be used instead of or in conjunction with Tylose® is polyethylene glycol that has a molecular weight of between 20,000 and 35,000. Like Tylose® 4000, polyethylene glycol works as a lubricant and adds plasticity to the mixture. In addition, it results in a smoother surface.

From the foregoing, it will be readily appreciated that the amount of the rheology-modifying agent will vary. Nevertheless, in most typical applications contemplated by the present invention, the amount of the rheology-modifying agent will be within the range from about 0.2% to about 10% by weight of the wet cementitious mixture. In the presently preferred embodiments, the amount of the rheology-modifying agent will be within the range from about 0.5% to about 5% by weight of the wet cementitious mixture, and most preferably within the range from about 1% to about 2.5% by weight of the wet cementitious mixture.

In addition, in the case of a foamed cementitious material, Tylose® and other plasticizers help stabilize the mixture and keep the air entrained within the mixture.

E. Nonfibrous Aggregates.

It is within the scope of the present invention to include aggregates commonly used in the cement industry with powdered hydraulic cements, with no particular reference to the time of hydration. However, unlike many concrete products, the main purpose for the addition of aggregates to the compositions of the present invention is to make the cementitious material lightweight, rather than imparting significant strength to the material (although aggregates which are not lightweight can also be used in certain embodiments).

Examples of aggregates which can add a lightweight characteristic to the cementitious mixture include perlite, vermiculite, glass beads, hollow glass spheres, sodium silicate macrospheres, exfoliated rock, lightweight concrete, lightweight synthetic materials (e.g., porous ceramic spheres, tabular alumina, aerogels, etc.), lightweight expanded clays, expanded fly ash, expanded slag, pumice, and other lightweight and environmentally geological materials.

In addition to these lightweight inorganic aggregates, certain organic, polymeric, or elastomeric aggregates such as cork or plastic spheres can be used as an aggregate material to impart lightweight properties or flexibility into the finished product. Lightweight plastic spheres are especially useful in certain applications of the present invention where a combination of low weight and high flexibility and resilience is necessary, such as in materials used to cushion, partition, separate, wrap, line or space.

Examples of inorganic aggregate materials which mainly impart bulk and/or strength to the cementitious mixture include clay, sand, gravel, rock, limestone, calcium carbonate, alumina, silica, ground quartz, sandstone, gypsum (including calcium sulfate, and the hemihydrate and dihydrate of calcium sulfate), and other geologic materials. In fact, a variety of waste products can be used as aggregates, e.g., sludge balls, rice husks, and cementitious products such as used packaging materials manufactured according to the present invention or the packaging containers disclosed and claimed in copending parent application Ser. No. 07/929,898 (abandoned).

In addition to conventional aggregates used in the cement industry, a wide variety of other aggregates, including fillers, strengtheners, metals and metal alloys (such as stainless steel, calcium aluminate, iron, copper, silver, and gold), balls or hollow spherical materials (such as glass, polymers, and metals), filings, pellets, powders (such as microsilica), and fibers (such as graphite, silica, alumina, fiberglass, polymeric, organic fibers, and such other fibers typically used to prepare various types of composites), may be combined with the hydraulic cements within the scope of the present invention. Even materials such as seeds, starch granules, gelatins, and solid agar-type materials can be incorporated as aggregates in the present invention.

Flexible, biodegradable particles, such as amylopectin granules or other flexible starch-based particles are useful in certain embodiments. In addition, amylopectin granules are added to hydrated gypsum, which is dried and then heated, which causes the amylopectin granules to explode. This results in a very good aggregate comprising gypsum pieces.

Both clay and gypsum are particularly important aggregate materials because of their ready availability, extremely low cost, and ease of working and formation, and because they can also provide some degree of binding if added in high enough mounts. With regard to clay, the Brady, G. S. & Clauser, H. R., Materials Handbook (13th ed.), pp. 205–06, stated that "clay is the general term used to identify all earths that form a paste with water and harden when heated" (emphasis added). Most clays chiefly comprise silica and alumina, and are used for making pottery, tiles, brick, and pipes. The clay-type material in all clays is kaolinite, which generally takes two forms, anauxite ($Al_2O_3.3SiO_2.2H_2O$) and montmorillonite ($Al_2O_3.4SiO_2.H_2O$). However, clays have a wide range of compositions and contain other substances such as iron oxide, titanium oxide, calcium oxide, zirconium oxide, and pyrite.

In addition, although clays have been used for millennia and can obtain form stability even without being fired, such unfired clays are vulnerable to water degradation and have never been used to form containers useful for storing, packaging, or shipping a variety of different products. Nevertheless, it has been found that by adding cement to clay, a fairly strong yet extremely inexpensive material can be formed. If clay is included in large enough amounts it tends to impart some degree of binding to the cementitious mixture.

Similarly, gypsum is also hydratable and forms the dihydrate of calcium sulfate when water is added. Thus, gypsum exhibits characteristics of both an aggregate and a hydraulic binder depending on the amount and particle size of the added gypsum.

From the foregoing, it will be understood that the amount of the aggregate will vary depending upon the application. There are many situations when little or no aggregate will be used. However, in most situations, the amount the aggregate will not exceed is about 90% by weight of the wet cementitious mixture. In the products contemplated by the present invention where high insulation is desired, the amount of aggregates will usually be within the range from about 1% to about 60% by weight, and most preferably, within the range from about 20% to about 50% by weight. Heavier aggregates are also added in approximately these same amounts.

A preferred polymeric sphere is made from lightweight polyethylene, with a density of 0.01 to 0.3 $g/cm^3$ and a particle size of less than 100 microns, although larger spheres may be preferred in larger packaging materials.

In those products where lightweight plastic spheres are used, such as in lightweight and flexible containers, partitions, or lining materials, the amount of plastic spheres will preferably be within the range from about 1% to about 10% by weight, and most preferably within the range from about 3% to about 6%. Hence, cushioning materials made according to the present invention that contain plastic spheres are far more environmentally neutral than those made from polystyrene, the almost universal cushioning material of choice.

While polystyrene products are 100% polystyrene, preferred embodiments of cushioned containers made according to the present invention only contain from 3% to 6% plastic. Thus, pound for pound, the cushioning materials of the present invention impart far less plastic into the environment than their polystyrene counterparts. Of course, if water degradable flexible aggregates such as, for example, agar or amylopectin granules are used instead of plastic balls, the cushioning materials will be essentially nonpolluting.

It should be understood that the microstructural engineering approach of the present invention allows the design of containers where the majority of plastic balls, if added, are concentrated near the surface of the container where the need for flexibility is the greatest. Similarly, near the core of the container where durability and rigidity are more important there might be few or no plastic balls.

This concentration of plastic balls near the surface of the container increases their effectiveness while allowing for the addition of fewer plastic bails, thus making the containers of the present invention even more environmentally sound. Such containers might contain as little as 1% plastic balls by weight.

Further, it will be appreciated that for any given product, certain of these aggregates may be preferable while others may not be usable. For example, in some applications, certain of the aggregates may contain materials that could leach from the cementitious mixture and may be toxic; nevertheless, most of the preferred materials are not only nontoxic under most uses, but they are also more environmentally neutral than the components in existing products.

Fibrous aggregates are used in the present invention primarily to modify the strength characteristics of the cementitious mixture, to add form stability to the mixture, and to add strength, flexibility, and ductility to the resulting cementitious matrix, although certain fibers may also impart some level of insulation to the materials as well. Therefore, the term "aggregates" will refer to all other solid filler materials, which are nonfibrous.

It is also within the scope of the present invention to include set hydraulic cement compositions as examples of aggregates. Examples of hydraulic cement compositions include used containers of the present invention, which can be recycled and used as aggregates in the hydraulic cement compositions of new containers within the scope of the present invention. Moreover, due to more restrictive environmental legislation, many ready-mix concrete suppliers are often obligated to incorporate used cementitious products as aggregates into their concrete products. The containers of the present invention are ideally suited for such a use, or they can be recycled and reincorporated into other containers.

The use of different sizes of aggregates allows for ease in upscaling the properties of the cementitious mixture. For example, through the use of larger aggregate, it is easy to obtain a high ratio of volume to surface area. Depending upon the specific aggregates used, this can increase the strength of the cementitious mixture or increase the insulative effect.

For many uses, it is preferable to include a plurality of differently sized and graded aggregates capable of filling interstices between the aggregates and the hydraulic cement so that less water is necessary and, hence, greater strength can be achieved. In such cases, the differently sized aggregates would typically have particle sizes in the range from as small as about 0.5 microns to as large as about 2 inches. (Of course, the purpose of the resulting cementitious product will dictate the preferred properties of the concrete and the appropriate size of the aggregates to be used.) It is within the skill of one in the art to know generally which aggregates are to be used to achieve the desired characteristics in the final cement or concrete article or structure.

In certain preferred embodiments of the present invention, it is desirable to maximize the amount of the aggregates in the cementitious mixture in order to maximize the properties and characteristics of the aggregates (such as their lightweight or insulative qualities). In order to maximize the amount of the aggregates, the use of particle packing techniques is desirable. A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the thesis of Andersen, P. J. "Control and Monitoring of Concrete Production—A Study of Particle Packing and Rheology," The Danish Academy of Technical Sciences (1990). For purposes of teaching particle packing techniques, the disclosures of the foregoing article and thesis are incorporated herein by specific reference. The advantages of such packing of the aggregates can be further understood by reference to the examples which follow in which hollow glass balls of varying sizes are mixed in order to maximize the amount of the glass balls in the cementitious mixture.

In embodiments in which it is desirable to obtain a container which has a high insulation capability, it is preferable to incorporate into the cement matrix an aggregate which has a low thermal conductivity, or "K-factor" (measured as W/m-K). The preferred aggregates include expanded or exfoliated vermiculite, perlite, calcined diatomaceous earth, and hollow glass spheres—all of which tend to contain large amounts of incorporated interstitial space.

This interstitial space, which is comprised of microscopically small fixed air spaces, greatly lowers the K-factor of these aggregates, thereby greatly increasing the insulation capability of the container involved. However, this list is in no way intended to be exhaustive, these aggregates being chosen because of their low cost and ready availability. Nevertheless, any aggregate with a low K-factor, which is able to impart sufficient insulation properties into the cementitious container, is within the purview of the present invention.

F. Fibrous Materials.

Fibers are a special kind of aggregate which can be added to the cement paste to increase the flexural strength, toughness, and tensile and compressive strength of the resulting cementitious materials. The concept of adding fibers is analogous to reinforcing concrete with steel bars or wire, except that the reinforcement is on a "micro" rather than "macro" level. The use of fibers dramatically increases the fracture energy of the cementitious materials, which make the resulting containers particularly useful for packaging, storing, and shipping goods.

The fibers which are incorporated into the cement matrix are preferably naturally occurring fibers, such as fibers extracted from plant leaves and stems. However, they can be any naturally occurring fiber typically comprised of cellulose. Other suitable fibers include fibers made from glass, silica, ceramic or metal. (One of the glass fibers utilized in the specific examples which follow is CEMFILL®, a product manufactured by Pilkinton Corp. Preferably, such glass fibers are pretreated to be alkali resistant.) The only limiting criteria is that the fibers impart the desired properties without causing the container or packing material to contaminate any goods with which they may come in contact.

It will be appreciated that the addition of fibrous materials to concrete is not in and of itself a new concept. However, the cost of adding various fibers to concrete used in massive quantities (such as building materials, sidewalks, and highways) is simply prohibitive. In the manufacture of containers, the qualities added by the fibrous materials can be cost effective in light of the products being produced.

Preferred fibers of choice include glass fibers and abaca fiber, which is extracted from a Philippine hemp plant related to the banana. The abaca fibers used in the examples which follow were purchased from Skamol Corp., Nykobing Mors, Denmark. These fibers were used due to their low cost, high strength, durability in an alkaline environment, and ready availability. Nevertheless, any equivalent fiber which imparts strength, as well as flexibility if needed, is certainly within the scope of the present invention. Such fiber includes wood fiber, particularly pine because of its low cost and ready availability, and recycled paper fiber.

It is preferable that the fibers have a minimum length to width ratio (or "aspect ratio") of at least 10:1. However, a greater aspect ratio is better since a longer, narrower fiber is able to impart a greater amount of strength to the cement matrix without adding more bulk and mass to the mixture. Fibers with an aspect ratio of greater than 100:1 are more preferred, while an aspect ratio of between 200:1 to 300:1 is most preferred.

Another important consideration is the ratio of fiber length relative to the length of the cement particles within the cement matrix. At a minimum, for the fibers to impart even minimal strength to the cement matrix, they must be at least twice the length of the cement particles within the cementitious mixture. The fibers are more preferably many times the length of the cement particles. Fibers having at least 10 times the average length of the cement particles work well. Fibers having at least 100 times the average length of the cement particles work better, while fibers having a length of greater than 1000 times the average length of the cement particles work best. High fiber length to cement length ratios can be achieved by either increasing the absolute length of the added fibers or, alternatively, by using a more finely milled cement.

Microscopic analysis of materials made according to the present invention show that certain mixing and molding processes of the present invention tend to circumferentially, and generally unidirectionally, orient the fibers within the wall of the container. It will be readily appreciated how this results in the advantageous properties discussed above.

As with aggregates, the amount of fiber added to the cementitious matrix will vary depending upon the desired product. Since the purpose of the fibers is usually to add strength, this becomes the principal criterion for determining the amount of fibers to be added. Nevertheless, in most situations the amount of the fibers will not exceed about 50% by volume. In the "foam-type," "clay-type," or "foam-clay" products contemplated by the present invention, the amount of fibers will generally be within the range from about 0.5% to about 20% by volume, and most preferably, within the range from about 5% to about 15% by volume.

G. Air Voids.

In those applications where insulation and cushioning is an important criterion, it is an important aspect of the present invention that the containers contain air pockets or voids within the cement matrix. The incorporation of air voids into the cementitious mixture is carefully calculated to impart the requisite insulation and/or cushioning characteristics, without degrading the strength of the container to the point of nonutility. Generally, however, if insulation, low weight, and/or cushioning are not important features of a particular product, it is desirable to minimize any air voids in order to maximize strength, and thus minimize the weight and volume of material necessary to achieve the required strength properties.

In certain embodiments, air pockets can be introduced by high shear, high speed mixing of the cement paste, with a foaming or stabilizing agent added to the mixture to aid in the incorporation of air pockets. The high shear, high energy mixers discussed above are particularly adept in achieving this desired goal. Suitable foaming or air entrainment agents include commonly used surfactants and materials; currently preferred embodiments of such surfactants include a polypeptide alkylene polyol (Mearlcrete® Foam Liquid) and a synthetic liquid anionic biodegradable solution (Mearlcel 3532®), both available from the Mead Corporation in New Jersey.

In this process, a gas can also be injected into the cement paste such that it is substantially uniformly incorporated by the high energy mixer and then entrained by the foaming agent. A variety of different gases can be utilized; many inexpensive gases suitable for use in the cement paste are available. One currently preferred gas is carbon dioxide, since carbon dioxide can react with the components of the hydraulic cement to increase the strength of the resultant cement paste.

Once the air has been entrained within the cementitious mixture, it is often desirable to stabilize the mixture by adding a stabilizing agent. Once such material is vinsol resin which is available from Sika Company. In addition, it has been found that Tylose® tends to stabilize foamed mixtures. The stabilizing agents help maintain the air within the cementitious mixture.

This process of incorporating gas into the cementitious mixture is generally suitable for processes where the cementitious mixture is relatively nonviscous, such as in injection molding, where the cement paste is injected through small holes.

During the process of molding and/or curing the cementitious mixture, it is often desirable to heat up the cementitious mixture in order to control the air void system and aid stabilizing the cementitious mixture form in the green state (immediately after molding). Of course, heating aids in rapidly removing significant mounts of the water from the cementitious mixture.

If a gas has been incorporated into the cementitious mixture, heating that mixture to 250° C. will result (according to the gas-volume equation) in the gas increasing its volume by about 78%. When heating is appropriate, it has been found desirable for the heating to be within a range from about 80° C. to about 250° C. More importantly, if properly controlled, heating will not result in the cracking of the structural matrix of the container or yield imperfections in the surface texture of the container. However, in the use of plastic balls, such as polyethylene balls, it is important that the temperature be kept below the melting point of these materials to prevent their melting, which would result in a product which is rigid and inflexible. However, the melding of plastic into the cementitious mixture would result in a stronger container.

In other applications, where viscosity of the cement paste is high, such as in roller casting or ram pressing, it is much more difficult to obtain adequate numbers of air voids through high shear mixing. In this case, air voids are alternatively introduced into the cement paste by adding an easily oxidized metal, such as aluminum, zinc, or tin into the highly alkaline cement paste. To enhance the effect of the metal, it is preferable to add a base (such as sodium hydroxide) to the cementitious mixture, which preferably raises the pH to between about 13–14 and causes these metals to undergo oxidation. At the same time, some of the ions (such as hydrogen ions) present in the water are concomitantly reduced to a gaseous product (such as hydrogen gas), which then becomes dispersed throughout the cement paste in the form of microscopic bubbles.

Aluminum and zinc are the preferred metals of choice because of their relatively low cost compared to other metals which undergo oxidation when exposed to basic conditions. Nevertheless, it should be understood that any metal that is easily oxidized when exposed to highly alkaline conditions would work equally well and would be within the scope of the present invention.

Vinsol resin and Tylose® are both useful in stabilizing and maintaining the hydrogen bubbles within the wet cementitious mixture while it cures.

Often, it is further desirable to heat the mixture in order to increase or control the rate of oxidation and facilitate the formation of hydrogen bubbles. It has been found that heating the molded product to temperatures in the range of from about 50° C. to about 100 ° C., and preferably about 75° C. to about 85° C., effectively controls the reaction and also drives off a significant amount of the water. Again, this heating process does not result in the introduction of cracks into the matrix of the molded product.

It has also been discovered that, after the cementitious container or packing material has solidified, many of the compositional designs of the present invention result in a matrix that is slightly permeable, especially to tiny hydrogen gas molecules, which can diffuse out of the cement matrix. This breatheability factor can often be desirable depending on the types of goods being packaged, stored, or shipped.

This second method of introducing air voids into the cement matrix can be used in conjunction with, or in place of, the introduction of air through high speed, high shear mixing in the case of low viscosity cement pastes used in injection molding. Air voids not only increase the insulative and cushioning properties of the cementitious containers, but also greatly decrease the bulk specific gravity, and hence the weight, of the final product. This reduces the overall mass of each container, which reduces the amount of material that goes into the manufacture of the container, and the amount of material that will ultimately be disposed of in the case of disposable cementitious containers. In addition, it is usually advantageous for such materials to be lightweight, especially when using them to ship goods.

H. Protective Coatings.

In certain applications, it might be desirable to provide the containers of the present invention with a protective coating. In one embodiment, the containers are coated and sealed with a layer of calcium carbonate to ensure they are impermeable to liquids. Besides calcium carbonate, any approved coating material would work depending on the application involved. Other coatings include clay and mica, which has good printing capability.

For example, a coating comprised of sodium silicate, which is acid resistant, is a particularly useful coating where the container is exposed to goods having a high acid content. Where it is desirable to protect the container from basic substances, the containers can be coated with an appropriate polymer or wax, such as bee's wax or mineral wax, which are used to coat paper containers.

In some applications, such as in the products which tend to emit water vapor, it is important that the coating allow the container to "breathe," or be permeable to water molecules, while still maintaining its ability to be water-proof. In other words, in a "breathable" container, water cannot pass through the wall of the container, but water vapor can.

Another type of coating that may be placed on the surface of the cementitious containers of the present invention is a reflective coating for reflecting heat into or out of the container. Such reflective coatings are well known in the art, although their applicability to cementitious containers is novel.

While the specific coating which may be used will depend upon the desired features for the final products, most coatings will be applied in a solvent so that upon evaporation of the solvent the coating remains on the surface of cementitious product. Examples of suitable coatings include melamine, polyvinyl chloride, polyvinyl alcohol, polyvinyl acetate, sodium silicates, calcium carbonates, polyacrylates, acrylic acrylate, polyurethanes, melamines, Zein®, and ceramics.

I. Other Materials.

For commercial purposes, it is often desirable that the surfaces of the containers be capable of receiving ink or other printing indicia. Of course, cementitious products such as those disclosed herein are particularly well suited for such a use. Furthermore, as mentioned above, it is within the scope of the present invention to coat the cementitious container with a government approved coating, most of which are currently used and well adapted for placing indicia thereon.

Indeed, calcium carbonate is well known in the printing industry as being an effective surface on which indicia can be placed. Hence, most of the presently known prior art methods of printing or placing indicia on containers are usable in connection with the present invention. Not only can decals be placed on the surface, but the porosity of the cementitious surface itself is such that it will properly absorb ink without running; even multiple color or multiple layer printing is relatively easily achieved. In addition, clay or mica surfaces would also work well.

II. Specific Applications of the Components in the Packaging Containers and Materials.

It is important that the basic structural component of the containers of the present invention be the hydraulic cement matrix. Within the basic matrix of hydraulic cement and water are incorporated other components which add additional characteristics and properties, such as fibers, aggregates, air voids, rheology-modifying plasticizing agents, and even accelerators.

A. Purposes of Components in Cementitious Mixtures.

As discussed above, fibers are added to impart strength and some insulation to the cementitious container. Aggregates are employed to increase the ability to decrease the bulk specific gravity of the packaging material and to add insulative properties. While some aggregates are lightweight in themselves, other aggregates, such as sand, make a stronger and more easily extrudable product that can be made with large amounts of intrastructural space, such as the honeycomb. This greatly reduces the effective density of "block density" of the container walls.

Discontinuous, nonagglomerated air voids can be mechanically or chemically introduced into the cementitious mixture; these voids also greatly decrease the bulk specific gravity of the final cement product, making the containers more lightweight, cushioning, and insulative.

Because this invention is directed toward containers, which are intended to come into contact with human hands in many cases, the materials within the containers must not contain, or impart into the goods contained therein, any hazardous substances. The containers of the present invention are typically comprised of a hydraulic cement, water, one or more aggregates, a rheology modifying agent, and one or more fibers. Appropriate hydraulic cements that can be used herein contain differing quantities of the following compounds before hydration: CaO, $SiO_2$, $Al_2O_3$, $Fe_2O_3$, MgO, and $SO_3$. Upon hydration, these react to form very stable, unreactive rock-like compounds, which are essentially harmless to humans and animals.

The fibers used herein are preferably natural fibers made from cellulose or glass fibers. Either type of fiber is harmless to humans and animals. The aggregates used in this invention are preferably small, lightweight, rock-like substances; in fact, these materials preferably contain a high percentage of air voids. Like cement, these are also very stable, unreactive, and harmless to humans and animals.

The size of the aggregates is controlled so that they are preferably about one fourth (or smaller) of the thickness of the container to be manufactured. As mentioned above, it is frequently desirable to employ particle packing techniques in order to maximize the desirable properties and characteristics of the aggregates into the cementitious mixture. Simply stated, these techniques maximize the mount of the aggregates in the matrix and minimize the space (and hence the discontinuities) between the aggregates. Thus, the strength and other properties of the total cementitious matrix becomes dependent upon that of the aggregates and the hydraulic cement.

The discontinuous voids which are chemically introduced are most likely to be filled with air after the hydrogen diffuses out of the cement matrix. (Although as taught elsewhere, other similarly safe gases can be used in the manufacturing process.) Contrast this with polystyrene foam containers wherein the air pockets might contain harmful CFC's or other gaseous agents involved in the manufacture of polystyrene. Likewise, paper products are impregnated with tiny quantities of dioxin, as discussed above.

The cementitious containers within the scope of the present invention can be characterized as being lightweight, yet retaining the sufficient strength for the desired purpose. Preferably, compositions of the present invention will have a bulk specific gravity of less than 2.0 $g/cm^3$, and in some cases, less than 1.0 $g/cm^3$. However, in the case of powder pressing, the density of the resulting container walls will be about 2–3 $g/cm^3$.

Typically, the cementitious containers will have a compressive strength to bulk density ratio in the range from about 0.5 $MPa\text{-}cm^3/g$ to about 1000 $MPa\text{-}cm^3/g$. In the preferred embodiments, the strength to bulk density ratio will usually be in the range from about 3 $MPa\text{-}cm^3/g$ to about 50 $MPa\text{-}cm^3/g$, with the most preferred range being from about 5 $MPa\text{-}cm^3/g$ to about 10 $MPa\text{-}cm^3/g$.

A significant advantage of the cementitious containers of the present invention is that they do not require or result in the emission of dioxin or ozone depleting chemicals. In addition, when disposed of into the earth, they do not persist in the environment as do foreign materials which must biodegrade (often over a number of years) before they become environmentally innocuous. Instead, the waste cementitious containers are essentially composed of the same materials already found in the earth. Under the weight and pressure of typical landfills, such containers will crumble and break down into an environmentally neutral powder that is the same as, or at least compatible with, the dirt and rock already found within the landfill.

Furthermore, the cementitious containers are fully recyclable with a minimum amount of energy and effort. Unlike paper and plastic products, which require a substantial amount of processing in order to restore them to a suitable state as raw starting materials, cementitious products can be ground up and recycled by merely reincorporating the grindings into new containers as an aggregate component within a virgin cement paste. This quality of containing both a cementitious binder, along with an aggregate, is a further departure from prior art containers, which are typically comprised of a uniform material such as polystyrene or paper.

B. The Processing Techniques and Conditions.

The combination of hydraulic cements, aggregates, air voids, and fibers results in a composition that can be formed into relatively thin sheets or walls having roughly the same thickness as conventional containers made from paper or styrofoam. In addition, the composition can be formed into suitable shapes for cushioning, partitioning, lining, or wrapping goods within a container. The compositions are readily molded or processed into a variety of shapes, including containers, plates, cups, cartons, boxes, peanuts, crates, lids, partitions, liners, spacers, and similar products. In addition, the materials can be extruded into certain strong yet lightweight forms, such as honeycomb blocks or corrugated sheets. The resulting cementitious containers also have low bulk density (often the bulk specific gravity is less than 1.0 $g/cm^3$), resulting in a lightweight product which is comparable to conventional containers made of paper and styrofoam.

In order for the material to exhibit the best properties of high flexural strength and/or cushioning, the fibers can be aligned or stacked according to the present invention, instead of being randomly dispersed throughout the cement. It is preferable for the fibers to be laid out in a plane that is parallel to either of the two surfaces of the cement sheet or container wall. In a container, it is important, therefore, for the fibers within the container body to be circumferentially, preferably unidirectionally, aligned. Similarly, the fibers within the bottom of the container should be horizontally aligned.

Such alignment of fibers is achieved either by roller casting, ram-pressing, extrusion, pull-trusion, hot pressing, or high pressure extrusion of a plastic matrix. These processes result in near zero porosity in terms of large, continuous and unwanted air pockets which usually occur during normal cement manufacture. This greatly increases the flexural strength of the cement material and reduces the tendency of splitting or tearing when the container is exposed to external mechanical forces.

The undesirable discontinuities and voids in typically cementitious products should not be confused with the micro-pockets of air (or other gas) that are intentionally introduced by the direct introduction of gas, the use of a high energy mixer, or the addition of reactive metals. Undesired voids or discontinuities are large and randomly dispersed, and offer little in terms of added insulative properties, while at the same time greatly reducing the strength and consistency of the cement matrix. In contrast, the intentionally introduced gas bubbles or voids are generally uniformly dispersed throughout the cementitious mixture, very small, and able to insulate or cushion without substantially reducing the strength of the underlying cementitious structural matrix.

Containers incorporating large amounts of gas bubbles or voids and made by this method exhibit insulating and cushioning properties similar to those of styrofoam, and yet have sufficient strength that they will not break when dropped from heights as high as 2 or more meters. For example, cementitious mixtures made according to the present invention have been shown to provide sufficient insulation against heat which might occur, for example, during the shipping of goods. This ability to insulate is superior to typical containers made from paper, while being comparable to that of polystyrene products. In addition, the products of the present invention can be designed to have comparable cushioning characteristics to those of paper or polystyrene products.

By altering the quantities of cement, water, aggregates, fibers, and rheology-modifying plasticizing agents, it is possible to control the rheology, or flow property, of the cement paste. For example, in the case of ram-pressing or roller casting it is important to start with a relatively highly viscous cementitious mixture which is form stable in the green state so that it can maintain its shape after being formed, even before being fully cured.

On the other hand, in the case of extrusion, pull-trusion, or hot pressing, the cementitious mixture is preferably viscous but yet able to flow. Because containers formed by these methods solidify within a mold, it is not necessary that these cementitious mixture become form stable as quickly as in other types of processing. Nevertheless, even these less viscous cementitious mixtures must be able to become form stable very rapidly after being placed in the mold in order for the process to be economical. Generally, the longer the product remains in the mold, the higher the cost of manufacture. As discussed elsewhere, this is one reason why heat or gas-generating materials might be added to the cementitious mixture.

Nevertheless, whether a viscous or nonviscous cement paste is required, it is desirable to use a minimal amount of water. This is because it is important to control the capillary action of the water in the cementitious mixture, as this is a cause of the stickiness of the cementitious mixture, which in mm can cause problems in demolding the cementitious mixture from the mold. Hence, the capillary action of the water has be to modified in order for there to be quick release of the cementitious mixture in the molding process. Hence, the amount of water is kept to a minimum in order to eliminate free water so that there is no further chemical or mechanical adherence to the mold.

Furthermore, the resulting cement products are stronger if less water is used rather than an excess. Of course, where more water is used, more water must then be removed from the cementitious mixture during the curing process.

Therefore, in order to obtain a fairly nonviscous cement paste without the addition of excess water, it is important to utilize a rheology-modifying or plasticizing agent in the cementitious mixture. As discussed above, there are a variety of suitable rheology-modifying agents. The rheology-modifying agent makes the cementitious mixture plastic so that it will deform and flow when subjected to large forces during the molding process. The rheology-modifying agent then provides stability so that the molded cementitious product can withstand small forces such as gravitational forces (that is, support its own weight) and the forces involved in moving the product from the mold, as well as subsequent handling.

1. The "Molding" Process.

During the mixing of the cementitious paste, it is important to obtain flocculation or gelation of the mixture. For purposes of simplicity, the term "molding," as used in this specification and the appended claims, is intended to include the variety of molding, casting, and extrusion processes discussed herein or that are well known in the art with respect to materials such as clays, ceramics, and plastics, as well as the process of releasing (or "demolding") the cementitious product from the mold. The term "molding" also includes the additional processes that might occur while the cementitious mixture is in the mold, (e.g., heating the cementitious mixture, the reaction of the hydraulic cement with aluminum metal to release gas bubbles for incorporation into the cementitious mixture, and the expansion of the volume of the cementitious mixture in the mold).

The molding process (including extrusion and the other process discussed herein) allows for building strength into the structure formed by the cementitious mixture. For example, if a wall for a carton is formed of the cementitious mixture, it is possible to incorporate into the wall a variety of structures (such as a honeycomb, angular or square reinforcing rods, triangularly shaped forms, I-beams, cellular materials, peanuts, and corrugated materials) for added strength. Of course, any of the well-known structural techniques for adding strength through shape are generally applicable to the present invention.

In order for the cementitious mixtures of the present invention to be effectively molded, it is important that the cementitious composition be form stable in the green state; that is to say, the molded product must rapidly (preferably in three seconds or less) be able to support its own weight. Further, it must harden sufficiently that it can be quickly ejected from the mold. Otherwise, the cost of molding may make the process uneconomical. In addition, the surface of the molded cementitious article cannot be too sticky, as that would make the demolding process impossible and make it difficult to handle and stack the molded articles.

As discussed above, the use of the rheology-modifying agent functions as an agent to aid with the flow and subsequent rapid stability of the cementitious mixture during and after the molding process. Further, minimizing the amount of water modifies the capillary action of the cementitious mixture and limits the free water so that there is not chemical or mechanical adherence to the mold.

There are several modifications to conventional molding processes which are preferably employed in order to ease the manufacturing process. For example, it is frequently desirable to treat the mold with a releasing agent in order to prevent sticking. Suitable releasing agents include silicon oil, Teflon®, Deleron®, and UHW®. Preferably, the mold itself will be made of steel or of a material with a very "slick" finish, such as Teflon® or Deleron®. If the mold is made from steel, it will preferably be plated with either polished nickel or chromium. However, regardless of the material used, it is important that the mold be kept hot (>50° C.) to create a thin layer of steam between the cementitious mixture and the mold to aid in demolding the product.

The same effect can be achieved from the use of frictional forces. By spinning the head of the molding apparatus against the interior and/or exterior surfaces of the cementitious material, any chemical and mechanical adherence (i.e., stickiness) to the mold can be overcome.

During the process of molding and/or curing the cementitious mixture, it is often desirable to heat up the cementitious mixture in order to control the air void system by allowing for proper control of the porosity and the volume in the container. However, this heating process also aids in making the cementitious mixture form stable in the green state (immediately after molding) by allowing the surface to gain strength quickly. Of course, this heating aids in rapidly removing significant amounts of the water from the cementitious mixture. The result of these advantages is that the use of the heating process can ease the manufacturing of the cementitious containers.

If a gas has been incorporated into the cementitious mixture, heating that mixture to 250° C. will result (according to the gas-volume equation) in the gas increasing its volume by about 78%. When heating is appropriate, it has been found desirable for that heating to be in the range from about 80° C. to about 250° C. More importantly, when properly controlled, heating will not result in the formulation of cracks in the structural matrix of the finished product or imperfections in the surface texture of the product, and will not result in the melting of any added plastic balls.

In fact, the process of adding gas bubbles to the cementitious mixture during the molding process can help the molded product to quickly gain stability. From the foregoing disclosure, it will be apparent that this can be accomplished by the addition of a gas-generating material, such as an easily oxidized metal like zinc or aluminum, and that the gas generating process can be accelerated by the addition of a base and/or heat.

An important molding process within the scope of the present invention includes extruding the cementitious material through a slit ⅛ inch wide, after which the extruded material is passed between a pair of rollers to create a more uniformly thick sheet. Depending upon the space between the rollers, cementitious sheets can be made that have thicknesses as low as 0.2 mm, which is the thickness of paper. Cementitious sheets having thicknesses between about 0.25 mm to about 0.35 mm are commonly used in the present invention to manufacture containers.

Although it is often preferable to coat the rollers with any of the nonstick materials discussed above, it is more important to heat the rollers to a temperature to prevent sticking of the material to the rollers. Typically the roller temperatures will be within the range from about 50° C. to about 150° C. Not only do the heated rollers prevent the cementitious materials passed therethrough from sticking, but they also help the materials to more quickly reach form stability. In addition, it is often preferable to pass the rolled cementitious sheets through a drying oven, which causes the sheets to harden more quickly.

2. The Curing Process.

The compositions of the present invention must also rapidly gain sufficient strength for use as a container, unlike typical concrete products which need about 28 days to reach their final strength. This is essential so that the molded product can be quickly removed from the mold, further processed as necessary, stacked, and packaged. While no significant processing condition is necessarily modified for curing products within the scope of the present invention, many of the features discussed above (e.g., inter alia, the use of a rheology-modifying agent, controlling the capillary action of water, the introduction of air voids throughout the cementitious mixture, the use of heat, and creating form stability in the green state) are important for the cementitious products to achieve strength quickly and properly cure.

3. The Shaping Process.

Even after the cementitious mixture has been molded, it may yet be necessary to bend, fold, or otherwise shape the cured or uncured material into the desired shape of a container. For example, a flat sheet may be folded into the shape of a box, or rolled into a hollow cylindrical container. As the examples below demonstrate, it has been found that for some embodiments a box is most easily formed from a flat sheet containing fibers which is scored and folded after it has been cured. Similarly, some embodiments yield relatively thin cementitious sheets which can be handled much like paper. In fact, like paper or cardboard, such cementitious sheets can be rolled up and stored until needed.

In other embodiments, individual flat sheets can simply be joined together to make a box or container using adhesion methods known in the art without the need to fold an integral sheet. In this case, the cementitious sheets are made into the final product while in a semi-cured condition when they have greater flexibility than after they are cured.

In any event, the thickness of the cementitious structural matrix within the molded containers will preferably have a thickness less than about 20 mm, more preferably less than about 10 mm, and most preferably less than about 5 mm. In certain embodiments the thickness could even be less than 2 mm or 1 mm, especially where a more paper-like material is preferred.

In addition to flat sheets, corrugated sheets, much like corrugated cardboard commonly used in making boxes can be made using the compositions and procedures of the present invention. The corrugated material will generally have a fluted, or corrugated, inner sheet sandwiched between two flat, outer sheets.

The flat outer sheets are formed, as above, by first extruding, and then passing between a pair of rollers, the cementitious mixture. The outer sheets will preferably have thicknesses ranging from 0.5 mm to 2 mm.

The corrugated, or fluted inner sheet (which is similar to the fluted or corrugated inner sheet of an ordinary cardboard box) is formed by passing a semi-hardened flat sheet through a pair of rollers with intermeshing corrugated surfaces or teeth. The manufacturing process is preferably carried out in one continuous process wherein the newly formed flat sheet is immediately passed through a heat tunnel adjusted to create the optimal amount of hardening and then passed through the corrugated rollers. The corrugated rollers force the thin cementitious sheet into the fluted or corrugated shape. The corrugated sheet is then passed through a heat runnel to help it maintain its shape.

Glue is applied to the outer edges of the individual folds of the corrugated sheet by passing the corrugated sheet through a pair of glue covered rollers adequately spaced to apply the glue without destroying the corrugations. Alternatively, the glue can be applied by spraying glue onto the edges of the corrugated sheet. The corrugated sheet is then sandwiched between the two outer sheets and the combination allowed to harden.

For each of the materials described above, the thickness of the cementitious structural matrix will vary greatly depending on the particular application or use of the cementitious container. An important criterion in any case will usually be the minimizing of mass while maintaining adequate strength. Making a container with a minimum amount of cementitious material reduces the cost of manufacture and subsequent costs associated with shipping the containers before use, as well as using the containers when shipping other goods during their intended use. It also reduces the amount of cementitious waste which must be disposed of or recycled after the container has been discarded.

It should be understood that the microstructural engineering approach of the present invention allows for the manufacture of cementitious containers having a variety of strength and flexibility characteristics. Therefore, in some cases, adequate strength can be achieved by simply making the container out of a more rigid cementitious material. In other cases, it may be more advantageous to use a more flexible cementitious material that has thicker walls. In yet other cases, it may be possible to utilize two or more different cementitious materials having varying strength and flexibility characteristics to achieve the optimum properties. Hence, a major advantage of the present invention is the ability to create a large number of different materials having extremely diverse properties, which allows the optimization of containers so that they have all of the desired properties while using a minimum amount of cementitious material in their manufacture.

A major criterion with regard to the strength characteristics is that the containers be able to withstand the forces typically encountered for a particular use. For example, the walls of a container will need to be more rigid in some cases to resist downward pressure where the containers are stacked. In other cases, the containers will need to be able to resist inward pressure coming from the side of the container. In any event, a container must resist bursting and be able to protect the contents of the container. Using the flexible design techniques made possible by the cementitious materials of the present invention, an engineer can build into a container all of the necessary strength characteristics, while eliminating excess strength (and, hence, mass) where it is not needed.

III. Examples of the Preferred Embodiments.

To date, numerous tests have been performed comparing the properties of containers of varying composition. Below are specific examples of cementitious compositions which have been created according to the present invention. Examples 1-38 are preliminary in nature, and are included mainly to demonstrate the viability of manufacturing flat, plate-like objects from cementitious materials having a variety of densities and strengths. In addition, the cementitious mixtures of Examples 1-33 were also molded into cups, which demonstrates that these mix designs yield cementitious mixtures that can be molded into a variety of containment products.

EXAMPLE 1

A cementitious plate was formed by molding a cementitious mixture which contained the following components:

Portland White Cement 2.0 kg

Water 1.004 kg

Perlite 0.702 kg

Tylose® 4000 60 g

The cement, Tylose®, and the perlite were mixed for about 2 minutes; thereafter, the water was added and the mixture was blended for an additional 10 minutes. The resulting cementitious mixture had a water to cement ratio of approximately 0.5. The amount of the cement paste (cement and water) in this cementitious mixture was 79.8% by weight, with perlite comprising 18.6%, and the Tylose® being 1.6% by weight of the cementitious mixture.

The resultant cementitious mixture was then passed through a pair of rollers to form the shape of a plate which had a wall thickness of 4.5 mm. The plate was designed to have a predetermined bulk density by adding porous aggregates such as perlite or calcium silicate microspheres. These aggregates have a low specific gravity; consequently, the plate was fairly lightweight. The relatively large thickness of the plate resulted from an attempt to make the plate stronger.

The resulting cementitious plate had a good surface finish and was easily roller cast. While the plate was relatively heavy compared to later examples (having a bulk specific gravity of about 1.6), it did demonstrate the concept that a cementitious mixture could be designed that was form stable in the green state and still be molded by conventional means.

The cementitious mixture was also pressed into the shape of a cup using male and female molds. The cups had similar properties as the plates and demonstrate the viability of molding the cementitious mixture into the shape of a container.

EXAMPLE 2

A cementitious plate was formed by molding a cementitious mixture which contained the following components:

Portland White Cement 2.0 kg

Water 1.645 kg

Perlite 0.645 kg

Tylose® 4000 20 g

Tylose® FL 15002 15 g

Cemfill® glass fibers (4.5 mm; alkali resistant) 370 g

The cementitious mixture was made utilizing the procedures set forth with respect to Example 1, except that the fibers were added after mixing the cement, water, Tylose®, and perlite for about 10 minutes. The combined mix was then mixed for an additional 10 minutes. The resulting cementitious mixture had a water to cement ratio of approximately 0.82. The amount of the cement paste (cement and water) in this cementitious mixture was 77.6% by weight, with perlite comprising 13.7%, the Tylose® 4000 and Tylose® FL 15002 comprising 0.43% and 0.32%, respectively, and the glass fibers being 7.9% by weight of the cementitious mixture.

The resultant cementitious mixture was then passed between a pair of rollers and formed into the shape of a plate. The plate in this example had good surface finish, like the plate of Example 1, but it also had a higher toughness (i.e., fracture energy) than the plate of Example 1. In addition, the plate obtained in this example was lighter and had a lower density than the plate of Example 1. Finally, the plate in this example demonstrated an adequate amount of strength, and did not break when dropped onto a concrete floor from heights of up to 2 meters.

The cementitious mixture was also pressed into the shape of a cup using male and female molds. The cups had similar properties as the plates and demonstrate the viability of molding the cementitious mixture into the shape of a container.

EXAMPLE 3

A cementitious plate was formed by molding a cementitious mixture which contained the following components:

Portland White Cement 4.0 kg

Water 1.179 kg

Sodium silicate microspheres 1.33 kg

Tylose® FL 15002 30g

Cemfill® glass fibers (4.5 ram; alkali resistant) 508 g

The cementitious mixture was made utilizing the procedures set forth with respect to Example 2, except that the microspheres were added in place of the perlite. The resulting cementitious mixture had a water to cement ratio of approximately 0.29, which was dramatically lower than those of Examples 1 and 2. This demonstrates that, depending upon the aggregate system, significantly different water to cement ratios can be designed into the composition. The amount of the cement paste (cement and water) in this cementitious mixture was 73.5% by weight, with the microspheres comprising 18.9%, the Tylose® comprising 0.43%, and the glass fibers being 7.2% by weight of the cementitious mixture.

The resulting cementitious plate did not have as good a surface finish as Examples 1 and 2, but it was even more lightweight.

The cementitious mixture was also pressed into the shape of a cup using male and female molds. The cups had similar properties as the plates and demonstrate the viability of molding the cementitious mixture into the shape of a container.

In the next series of examples, microscopic and discontinuous, nonagglomerated air voids were introduced into the cement matrix, greatly decreasing the density of the plate, while not significantly reducing its strength to the point of nonutility.

EXAMPLE 4

A cementitious plate was formed by molding a cementitious mixture which contained the following components:

Portland White Cement 2.52 kg
Water 1.975 kg
Vermiculite 1.457 kg
Vinsol resin 2.5 g
Tylose® 4000 25 g
Tylose® FL 15002 75 g
Abaca fiber 159 g The cementitious mixture was made by prewetting the abaca fiber (which has been pretreated by the manufacturer so that greater than 85% of the cellulose is α-hydroxycellulose) and then adding the excess water and the fibers to the other components except the vermiculite. This mixture was mixed for about 10 minutes, and a further 10 minutes after the vermiculite was added. The resulting cementitious mixture had a water to cement ratio of approximately 0.78. The amount of the cement paste (cement and water) in this cementitious mixture was 72.3% by weight, with the vermiculite comprising 23.4%, the Tylose® 4000 and Tylose® FL 15002 comprising 0.40% and 1.21 %, respectively, the vinsol resin (a stabilizing agent) comprising 0.04%, and the abaca fibers being 2.6% by weight of the cementitious mixture.

A plate was formed by roller casting the material as in Examples 1–3. Unlike the plates of Examples 1–3, this plate was roller cast with a wall thickness of about 2.5 mm. The resulting cementitious plate had a high toughness and fracture energy.

The cementitious mixture was also pressed into the shape of a cup using male and female molds. The cups had similar properties as the plates and demonstrate the viability of molding the cementitious mixture into the shape of a container.

EXAMPLE 5

A cementitious plate was formed by passing through a pair of rollers a cementitious mixture which contained the following components:

Portland White Cement 2.52 kg
Water 2.31 kg
Vermiculite 2.407 kg
Vinsol resin 2.5 g
Tylose® 4000 25 g
Tylose® FL 15002 75 g
Abaca fiber 159 g
Aluminum (<100 mesh) 0.88 g The cementitious mixture was made utilizing the procedures set forth with respect to Example 4. The resulting cementitious mixture had a water to cement ratio of approximately 0.92. This mixture was readily roller cast, even though it had such a high water to cement ratio. The amount of the cement paste (cement and water) in this cementitious mixture was 64.4% by weight, with the vermiculite comprising 32.1%, the Tylose® 4000 and Tylose® FL 15002 comprising 0.33% and 1.0%, respectively, the vinsol resin (a stabilizing agent) comprising 0.03%, the abaca fibers being 2.1%, and the amount of aluminum being about 0.01% by weight of the cementitious mixture.

The aluminum resulted in the incorporation of air into the cementitious mixture. Hence, the resultant plate was more lightweight than the plate of Example 4. Nevertheless, the surface finish was smooth and there was no degradation in the toughness or fracture energy.

The cementitious mixture was also pressed into the shape of a cup using male and female molds. The cups had similar properties as the plates and demonstrate the viability of molding the cementitious mixture into the shape of a container.

EXAMPLE 6

A cementitious plate was formed by passing through a pair of rollers a cementitious mixture containing the following components:

Portland White Cement 2.52 kg
Water 1.65 kg
Vermiculite 1.179 kg
Perlite 0.262 kg
Vinsol resin 5.0 g
Tylose® 4000 12.5 g
Tylose® FL 15002 37.5 g
Abaca fiber 159 g
Aluminum (<100 mesh) 1.5 g The cementitious mixture was made utilizing the procedures set forth with respect to Example 4. The resulting cementitious mixture had a water to cement ratio of approximately 0.65. The amount of the cement paste (cement and water) in this cementitious mixture was 71.6% by weight, with the perlite comprising 4.5%, the vermiculite comprising 20.2%, the Tylose® 4000 and Tylose® FL 15002 comprising 0.21% and 0.64%, respectively, the vinsol resin (a stabilizing agent) comprising 0.086%, the abaca fibers being 2.7%, and the amount of aluminum being about 0.026% by weight of the cementitious mixture.

The resulting cementitious plate had properties and characteristics substantially similar to those of the plate of Example 5.

The plates of Examples 4–6 yielded better results than the plates of Examples 1–3, particularly with respect to their strength to bulk density ratios. The products were sufficiently strong, could be molded into thinner plates, and yet had lower bulk densities. These examples demonstrate that the incorporation of microscopic air voids can greatly decrease a plate's density without appreciably decreasing the strength. These also show that aluminum can be used to generate the air bubbles which can be entrained within the cementitious mixture.

The cementitious mixture was also pressed into the shape of a cup using male and female molds. The cups had similar properties as the plates and demonstrate the viability of molding the cementitious mixture into the shape of a container.

These and other experiments have shown that perlite tends to reduce the strength of the container regardless of how the cement paste was either mixed or molded. On the other hand, because vermiculite is plate-shaped it is advantageous, in terms of strength, to align the individual particles along parallel planes within the cementitious sheet. This is best achieved by either roller casting or ram pressing.

Similarly, the added fibers were most effective in imparting the desirable strength properties to align them within the cement matrix as well. This is usually achieved through extrusion, pull-trusion, or roller casting. Such alignment imparts much greater strength and toughness to the resulting packaging container.

It has also been discovered that where viscous cement paste is involved, it takes from between 5 and 10 minutes of mixing to obtain good flocculation of the cement paste and the resulting plastic behavior. In addition, it takes Tylose® about 5 minutes to "react" or impart its plasticizing properties to the mixture, depending on the mixer's intensity.

EXAMPLES 7–10

Cementitious plates were formed by passing, through a pair of rollers, cementitious mixtures containing glass bails (<1 mm) as the aggregate. The components for each example were as follows:

| Example | Cement | Water | Tylose ® FL 15002 | Glass Balls |
| --- | --- | --- | --- | --- |
| 7 | 4 kg | 2.18 kg | 200 g | 445 g |
| 8 | 3 kg | 1.85 kg | 150 g | 572 g |
| 9 | 2 kg | 1.57 kg | 100 g | 857 g |
| 10 | 1 kg | 1.55 kg | 100 g | 905 g |

The cementitious mixtures were prepared substantially according to the procedures of Example 4. The resulting cementitious mixtures of Examples 7–10 had water to cement ratios of approximately 0.55, 0.62, 0.79, and 1.58, respectively. Even with the high water to cement ratio of Example 10, the cementitious mixture was form stable in the green state and readily moldable. The percentage by weight of the glass bails in each example was 6.5%, 10.3%, 18.9%, and 25.3%, respectively.

The plates formed thereby were extremely lightweight, had densities in the range from about 0.25 to 0.7, and were 2.0 mm thick. In addition, the plates demonstrated good insulative capabilities, which may be important in certain applications, although they were not as strong as the plates of Examples 1–6. The tensile strength was 1–3 MPa, while the compressive strength was 2–10 MPa.

The cementitious mixtures were also pressed into the shape of a cup using male and female molds. The cups had similar properties as the plates and demonstrate the viability of molding the cementitious mixture into the shape of a container.

In terms of their insulation capability, the plates and cups were found to have a K value in the range of 0.04–1.15 w/m-° K.

The compositions of Examples 1–10 had varying strength characteristics but each could be easily molded and was form stable in the green state, which would allow them to be molded into a large variety of different thicknesses and shapes in order to achieve structural stability of the container or packing material using a minimum amount of cementitious material.

EXAMPLES 11–14

The cementitious mixtures of Examples 7–10 were altered by adding varying amounts of abaca fiber.

| Example | Corresponding Example | Amount of Abaca fibers |
| --- | --- | --- |
| 11 | 7 | 149 g |
| 12 | 8 | 152 g |
| 13 | 9 | 180 g |
| 14 | 10 | 181 g |

The resultant percentage by weight of the added abaca fiber in these examples was 2.1%, 2.7%, 3.8%, and 4.8%, respectively.

These cementitious materials were as lightweight and insulative as those of Examples 7–10, but they were much tougher and had a higher fracture energy. In addition, adding more fibers made the products more bendable, as in containers having hinged flaps or other closure mechanisms. Hence, the use of these abaca fibers, as well as other types of fibers, is particularly desirable in situations where such characteristics are desirable.

EXAMPLES 15–17

Plates and cups composed of cementitious mixtures of these examples were prepared according to the procedures, and using the components, of Example 7 (i.e., 4 kg of portland white cement is used) with the exceptions that aluminum powder (<100 mesh) and NaOH were added to the cementitious mixtures in the following amounts and the resultant molded plates were heated to about 80° C. for 30–60 minutes:

| Example | Aluminum | NaOH |
| --- | --- | --- |
| 15 | 4 g | 21.9 g |
| 16 | 6 g | 34.7 g |
| 17 | 8 g | 34.7 g |

The NaOH was added to the cementitious mixture to activate the aluminum by establishing a pH in the preferable range of about 13.1–13.8. The porosity of the cementitious mixture was increased, the bulk density was decreased, and insulation capability was increased, and the plates and cups were more lightweight. The rate and extent of the reaction of aluminum metal can be altered by adjusting the amount of aluminum and heat that are added. As more of each is added, the material becomes lighter, fluffier and softer, making good cushioning material.

It is important to note that shrinkage cracks were not observed in the plates of Examples 15–17, even though the cementitious mixtures were heated and much of the water was driven off rapidly.

EXAMPLES 18–21

Cementitious plates were formed by passing through a pair of rollers, cementitious mixtures containing the components for each example as follows:

| | Glass Balls | | | | |
| --- | --- | --- | --- | --- | --- |
| Example | Fine | Medium | Coarse | Aluminum | NaOH |
| 18 | 133 g | 317 g | 207 g | 4.0 g | 19.7 g |
| 19 | 133 g | 317 g | 207 g | 6.0 g | 31.2 g |
| 20 | 133 g | 317 g | 207 g | 8.0 g | 31.2 g |
| 21 | 133 g | 317 g | 207 g | 0.0 g | 0.0 g |

In each of these examples, there were 4 kg of portland white cement and 1.96 kg of water; hence, the water to cement ratio was 0.49. The amount of Tylose® FL 15002 in each mixture was 200 g, and 60 g of abaca fibers which were added to each mixture. The cementitious mixtures were prepared substantially according to the procedures of Example 7, with the exception that a mixture of three different sizes of glass balls was added. All of the glass balls were less than one millimeter. (Of course, Example 21 does not incorporate aluminum and NaOH.)

The percentage by weight of the total amount of glass balls in each of the cementitious mixtures of Examples 18–21 was 2.1%.

The cementitious mixtures were also pressed into the shape of a cup using male and female molds. The cups had similar properties as the plates and demonstrate the viability of molding the cementitious mixture into the shape of a container.

These materials were extremely lightweight (density <0.7) and were very insulative because of the amount of air and the effective packing of the glass balls incorporated into the mixtures. The cementitious mixtures of these examples demonstrated the value of packing the aggregates in order to maximize their effect in the resultant composition. While the cementitious mixture of Example 21 is a good composition for many circumstances, its insulative capabilities are not as great as the cementitious mixtures of Examples 18–20.

EXAMPLES 22–25

Cementitious plates were formed by passing through a pair of rollers, cementitious mixtures containing the components for each example as follows:

| | Glass Balls | | | | |
|---|---|---|---|---|---|
| Example | Fine | Medium | Coarse | Aluminum | NaOH |
| 22 | 171 g | 394 g | 267 g | 3.0 g | 16.7 g |
| 23 | 171 g | 394 g | 267 g | 4.5 g | 26.6 g |
| 24 | 171 g | 394 g | 267 g | 6.0 g | 26.6 g |
| 25 | 171 g | 394 g | 267 g | 0.0 g | 0.0 g |

In each of these examples, there were 3 kg of portland white cement and 1.67 kg of water; hence, the water to cement ratio was 0.56. The amount of Tylose® FL 15002 in each mixture was 150 g, and 60 g of abaca fibers were added to each mixture. The cementitious mixtures were prepared substantially according to the procedures of Examples 18–21.

The percentage by weight of the total amount of glass balls in each of the cementitious mixtures of Examples 22–25 was 3.4%.

The cementitious mixtures were also pressed into the shape of a cup using male and female molds. The cups had similar properties as the plates and demonstrate the viability of molding the cementitious mixture into the shape of a container.

These materials were extremely lightweight and very insulative because of the amount of air and the effective packing of the glass balls incorporated into the mixtures. The cementitious mixtures of these examples demonstrated the value of packing the aggregates in order to maximize their effect in the resultant composition. While the cementitious mixture of Example 25 is a good composition for many circumstances, it does not demonstrate the same insulative capabilities as the cementitious mixtures of Examples 22–24.

The plates of Examples 22–25 were more insulating and lighter than the corresponding plates of Examples 18–21. However, these plates had less strength than those with greater amounts of cement.

EXAMPLES 26–29

Cementitious plates were formed by passing through a pair of rollers, cementitious mixtures containing the components for each example as follows:

| | Glass Balls | | | | |
|---|---|---|---|---|---|
| Example | Fine | Medium | Coarse | Aluminum | NaOH |
| 26 | 257 g | 591 g | 400 g | 2.0 g | 14.2 g |
| 27 | 257 g | 591 g | 400 g | 3.0 g | 22.5 g |
| 28 | 257 g | 591 g | 400 g | 4.0 g | 22.5 g |
| 29 | 257 g | 591 g | 400 g | 0.0 g | 0.0 g |

In each of these examples, there were 2 kg of portland white cement and 1.41 kg of water; hence, the water to cement ratio was 0.71. The amount of Tylose® FL 15002 in each mixture was 100 g, and 60 g of abaca fibers were added to each mixture. The cementitious mixtures were prepared substantially according to the procedures of Examples 18–21.

The percentage by weight of the total amount of glass balls in each of the cementitious mixtures of Examples 26–29 was 6.8%.

The cementitious mixtures were also pressed into the shape of a cup using male and female molds. The cups had similar properties as the plates and demonstrate the viability of molding the cementitious mixture into the shape of a container.

These materials were extremely lightweight and very insulative because of the amount of air and the effective packing of the glass balls incorporated into the mixtures. The cementitious mixtures of these examples also demonstrate the value of packing the aggregates in order to maximize their effect in the resultant composition. While the cementitious mixture of Example 29 is a good composition for many circumstances, it does not demonstrate the same insulative capabilities as the cementitious mixtures of Examples 26–28.

The plates of Examples 26–29 were even more insulating and lighter than the corresponding plates of Examples 18–21. However, these plates had less strength that those with greater amounts of cement.

EXAMPLES 30–33

Cementitious plates were formed by passing through a pair of rollers, cementitious mixtures containing the components for each example as follows:

| | Glass Balls | | | | |
|---|---|---|---|---|---|
| Example | Fine | Medium | Coarse | Aluminum | NaOH |
| 30 | 271 g | 624 g | 422 g | 1.0 g | 14.3 g |
| 31 | 271 g | 624 g | 422 g | 1.5 g | 22.6 g |
| 32 | 271 g | 624 g | 422 g | 2.0 g | 22.6 g |
| 33 | 271 g | 624 g | 422 g | 0.0 g | 0.0 g |

In each of these examples, there was 1 kg of portland white cement and 1.42 kg of water; hence, the water to cement ratio was 1.42. The amount of Tylose® FL 15002 in each mixture was 100 g, and 60 g of abaca fibers were added to each mixture. The cementitious mixtures were prepared substantially according to the procedures of Examples 18–21. Even though the water to cement ratio of these cementitious mixtures was very high, they were readily extruded and roller cast.

The percentage by weight of the total amount of glass balls in each of the cementitious mixtures of Examples 30–33 was 9.7%.

The cementitious mixtures were also pressed into the shape of a cup using male and female molds. The cups had similar properties as the plates and demonstrate the viability of molding the cementitious mixture into the shape of a container.

These materials were extremely lightweight and very insulative because of the amount of air and the effective packing of the glass balls incorporated into the mixtures. The cementitious mixtures of these examples demonstrate the value of packing the aggregates in order to maximize their effect in the resultant composition. While the cementitious mixture of Example 33 is a good composition for many circumstances, it does not demonstrate the same insulative capabilities as the cementitious mixtures of Examples 30–32.

The plates of Examples 30–33 were more insulating and lighter than the corresponding plates of Examples 18–29, with K-factors that range between 0.04 to 0.07 W/m-K. However, these plates had less strength that those with greater amounts of cement.

EXAMPLES 34–35

Cementitious materials were formed from cementitious mixtures containing the following components:

| Example | Cement | Water | Tylose® FL 15002 | Abaca Fibers | Surfactant |
| --- | --- | --- | --- | --- | --- |
| 34 | 10 kg | 23.0 kg | 300 g | 200 g | 300 g |
| 35 | 10 kg | 20.0 kg | 300 g | 200 g | 300 g |

The cementitious mixtures were made by mixing the components for about 10 minutes in a high energy mixer of the type discussed above, which is available from E. Khashoggi Industries. This high energy and high speed mixer introduced significant amounts of air into the cementitious mixtures; this air was entrained within the cementitious mixture by use of the surfactant and stabilized by the Tylose®. The resulting cementitious mixtures were passed between a pair of rollers and formed into thin sheets (1 mm), which were then able to be scored and then folded into the shape of a box and glued together using adhesive techniques known in the art. These products can be cured by passing them through a heat tunnel, which gives them instantaneous green strength and helps remove excess water.

EXAMPLES 36–37

Cementitious materials were formed from cementitious mixtures containing the following components:

| Example | Cement | Water | Tylose® FL 15002 | Glass Fibers | Surfactant |
| --- | --- | --- | --- | --- | --- |
| 36 | 4.23 kg | 8.1 kg | 120 g | 260 g | 135 g |
| 37 | 10.0 kg | 20.0 kg | 300 g | 300 g | 300 g |

Like the products of Examples 34 and 35, the cementitious mixtures of these examples were made by mixing the components for about 10 minutes in a high energy mixer of the type discussed above. This high energy and high speed mixer introduced significant amounts of air into the cementitious mixtures; this air was entrained within the cementitious mixture by the surfactant and stabilized by the Tylose®. However, due to the glass fibers, the mixture was not as easily foamed and is not as lightweight and insulative as materials containing no glass fibers. The resulting cementitious mixtures were then passed between a pair of rollers and formed into thin sheets (1 mm) which were then able to be folded into the shape of a box and glued together using adhesive techniques known in the art. These products can be cured by passing them through a heat tunnel, which gives them instantaneous green strength and helps remove excess water.

The resulting cementitious materials were also highly insulative and had a low bulk specific gravity in the range of about 0.25–0.4.

EXAMPLE 38

A plate was formed from a cementitious mixture of that set forth in Example 34, with the exception that about 1.2 kg of glass balls was added to the "foamed" mixture of cement, water, and Tylose®. The resultant plate has insulative property not significantly different from standard styrofoam plates. The plate of this example was placed in an oven for three hours at 150° C. and could still be removed with bare fingers.

The plates according to Examples 1–38 demonstrate that cementitious structures suitable for incorporation into packaging containers could be manufactured from extremely inexpensive cementitious materials, which are also environmentally compatible. However, although these cementitious products have application for a wide variety of packaging uses, including containers, both rigid and lightweight, they had insufficient flexibility, compressive resilience, or bendability for certain packaging applications.

For example, the cementitious materials formed in Examples 1–38 did not show the flexibility or compressive resilience of plastic packaging materials such as polystyrene, nor did they have the bendability of paper or cardboard necessary to bend the cementitious sheets into the form of a box or other packaging container. The following examples demonstrate how to obtain such materials.

EXAMPLE 39

Thin cementitious sheets were formed by molding a cementitious mixture which include the following:

Portland White Cement 1.0 kg
Water 2.5 kg
Tylose® FL 15002 200 g
Hollow Glass Spheres (<100 microns) 1.0 kg
Abaca Fiber 10% by volume The cementitious mixture was made by prewetting the abaca fiber (which has been pretreated by the manufacturer so that greater than 85% of the cellulose is α-hydroxycellulose) and then adding the excess water and the fibers to a mixture of Tylose® and portland cement. This mixture was mixed at relatively high speed for about 10 minutes, and then at a relatively slow speed for 10 minutes after the hollow glass spheres were added. The resulting cementitious mixture had a water to cement ratio of approximately 2.5.

This mixture was passed between a pair of rollers and formed into thin sheets of about 1 mm in thickness. Wet sheets were scored and then folded in an attempt to create a box. However, there was a fair amount of splitting and a box with sufficient strength and integrity could not be formed.

Thereafter, sheets that were first allowed to cure were scored, folded into the shape of a box, and then glued together by cementing or gluing methods which are well known in the art of adhering cement sheets. The amount of splitting at the fold was negligible, which demonstrated that it is preferable to score and then fold the thin sheets after they have been allowed to care or solidify somewhat. The thin sheets could be formed into a box that had the shape, look and weight of a dry cereal box used in the market.

In addition, the cared sheets were cut and rolled into the shape of a cup. This example demonstrates that it is possible to make boxes or containers in the shape of most any other cardboard, paper, or plastic packaging material used on the market today.

The following examples demonstrate that flexible cementitious materials having high toughness and strength can be manufactured. They are useful in containment applications where cushioning and flexibility are important criteria.

EXAMPLES 40–44

Flexible cementitious materials were formed from cementitious mixtures that contain the following components:

| Example | Plastic Balls | Cement | Water | Tylose ® |
|---|---|---|---|---|
| 40 | 0.12 kg | 1.0 kg | 2.0 kg | 0.1 kg |
| 41 | 0.1213 kg | 0.8 kg | 2.0 kg | 0.1 kg |
| 42 | 0.1225 kg | 0.6 kg | 2.0 kg | 0.1 kg |
| 43 | 0.1238 kg | 0.4 kg | 2.0 kg | 0.1 kg |
| 44 | 0.1251 kg | 0.2 kg | 2.0 kg | 0.1 kg |

The "plastic balls" are made from polypropylene and have particle sizes smaller than 100 microns and a density of 0.02 $g/cm^3$. The cementitious mixtures were mixed in substantially the same manner as in Example 7 and then formed into plates by passing them through a pair of rollers. The cementitious plates were very strong and flexible. The compressive strength of the plate made according to Example 40 was 2 MPa and the tensile strength was 1 MPa. The surprising feature is that the compressive and tensile strengths are of the same magnitude, which is very unusual for most cement products. Usually the compressive strength is far greater than tensile strength. As less cement is added, the compressive and tensile strengths decrease in increments, with the plate of Example 44 having a tensile strength of 0.5 MPa.

These packaging materials could be physically compressed without crumbling like their nonflexible, cementitious counterparts of earlier examples, even when subject to forces that were greater than forces normally experienced by styrofoam containment materials.

The densities of the cementitious packaging materials made in these examples range between 0.1 and 0.6 $g/cm^3$, with the density decreasing as less cement is used.

EXAMPLES 45–49

The cementitious mixtures of Examples 40–44 were instead extruded into rectangular bars which were about ½ $in^2$. The cementitious bars were very flexible and could be bent at least 90° (and, in some cases, 180°) without breaking, depending on the length of the bar. As the amount of cement was decreased relative to the amount of plastic balls, the flexibility increased while the tensile strength decreased. The rectangular bars could be used to reinforce, partition, or otherwise aid a cementitious container.

These examples demonstrate that flexible cementitious containers and accessories can be formed which take the place of flexible materials made of styrofoam. The advantage of these cementitious materials is the extremely small amounts of plastic that are used compared to styrofoam products, which are 100% polystyrene. In contrast, the containers made according to these examples only contain from between about 3.7% to about 5.1% plastic by weight, although they have densities that are similar to the density of polystyrene materials.

Although plastic balls less than 100 microns in diameter are used in these examples, depending on the wall thickness of the packaging material to be formed, it is possible to include plastic balls that have diameters of up to 5 min. In addition to plastic balls, any kind of plastic particle or fragment would work.

In many cases it may be preferrable to use a flexible, biodegradable particle made from a biodegradable polymer. Starch-based granules, particles, or spheres have recently been experimented with and might provide adequate flexibility while also being biodegradable.

EXAMPLES 50–54

Flexible cementitious packaging materials were made according to the composition of Example 40, except that prewetted abaca fibers were added in the amounts of 2%, 4%, 6%, 8%, and 10% by volume, respectively, in Examples 50–54, and mixed according to Example 39. The resulting cementitious plates and rectangular bars had substantially the same densities and flexibilities as in Examples 40 and 45, but with increasing strengths as more abaca fiber was added. However, as more abaca fiber was added, the ability to flex began to decrease somewhat. The tensile strengths of the materials formed herein ranged up to 5 MPa.

EXAMPLES 55–59

Flexible cementitious packaging materials were made according to the composition of Example 41, except that prewetted abaca fibers were added in the amounts of 2%, 4%, 6%, 8%, and 10% by volume, respectively, in Examples 55–59 and mixed according to Example 39. The resulting cementitious plates and rectangular bars had substantially the same densities and flexibilities as in Examples 41 and 46, but with increasing strengths as more abaca fiber was added. However, as more abaca fiber was added, the ability to flex began to decrease somewhat. The tensile strengths of the materials formed herein ranged up to about 5 MPa.

EXAMPLES 60–79

Cementitious packaging materials were prepared using each of the compositions of Examples 40–59, except that fine mesh aluminum powder (14.3 g) and NaOH (31.9 g) were added to the compositions during the general mixing step. In all other respects the compositions were mixed together in the same manner.

The aluminum metal reacted with the hydroxyl ion within the highly alkaline aqueous phase to form fine bubbles of hydrogen gas, causing the cementitious mixture to expand and become more lightweight. The final products formed therefrom were extremely lightweight and had up to 80% air voids by volume, but with sufficient strength for certain containment applications, where strength is less important, like wrapping, partitioning, or cushioning.

The cementitious mixtures in these examples can first be expanded and then molded, or molded and then expanded, depending upon the desired end product. For example, in some applications the unexpanded cementitious mixtures can be placed into a mold and then expanded within the mold. Where a mold is used, it is possible to use cementitious mixtures that have viscosities that are either greater or lower than mixtures that are suitable for either extrusion or passing between a pair of rollers.

Where high flexibility is desired, care must be taken to prevent the plastic spheres from melting by ensuring that the expansion temperature does not exceed the melting point of the plastic balls. If the plastic balls were to melt, they would meld with the cementitious mixture and lose their ability to impart flexibility, although this has the advantage of adding strength to the cementitious structural matrix.

EXAMPLES 80–99

Cementitious packaging materials were prepared using any of the compositions of Examples 40–59, except that fine mesh aluminum powder (21.4 g) and NaOH (31.9 g) were added to the compositions during the general mixing step. In all other respects the compositions were mixed together in the same manner.

The aluminum metal reacted with the hydroxyl ion within the highly alkaline aqueous phase to form fine bubbles of hydrogen gas, causing the cementitious mixture to expand and become lightweight. The final products formed therefrom were extremely lightweight and have up to 80% air voids by volume, but with sufficient strength for certain containment applications where strength is less important, such as wrapping, partitioning, or cushioning.

Because more aluminum was added in these examples than Examples 60–79, both the rate and amount of hydrogen gas formation increased, yielding a lighter, more insulative product. In all other respects, the compositions of Examples 80–99 were similar to those of Examples 60–79.

The next set of examples are simply variations and simplifications of the more rigid containment materials set forth above.

EXAMPLES 100–104

Cementitious packaging materials were formed which contain the following components:

| Example | Glass Spheres | Cement | Water | Tylose ® |
|---------|---------------|--------|-------|----------|
| 100 | 0.9 kg | 1.0 kg | 2.0 kg | 0.1 kg |
| 101 | 0.9095 kg | 0.8 kg | 2.0 kg | 0.1 kg |
| 102 | 0.9189 kg | 0.6 kg | 2.0 kg | 0.1 kg |
| 103 | 0.9284 kg | 0.4 kg | 2.0 kg | 0.1 kg |
| 104 | 0.0379 kg | 0.2 kg | 2.0 kg | 0.1 kg |

The water, cement, and Tylose® were mixed together for 10 minutes using a high speed mixer, after which the hollow glass spheres were added and the mixture stirred at slow speed for an additional 10 minutes. The mixtures were then passed between a pair of rollers to form thin sheets, and extruded to form rectangular bars ½ in². The cementitious products formed herein were fairly strong and very lightweight, although they lack the flexibility of materials made with plastic balls, or the bendability of materials made with fibers.

EXAMPLES 105–129

Cementitious packaging materials were prepared according to each of the compositions of Examples 100–104, respectively, except that prewetted abaca fibers were added during the first mixing step in amounts of 2%, 4%, 6%, 8%, and 10% by volume, respectively, to each of the five compositions of Examples 120–124. In all other respects the compositions were mixed together in the same manner. The products obtained in these examples were stronger than the materials of Examples 100–104 and have tensile strengths ranging from between 1 and 10 MPa in relation to the amount of fiber that was added.

EXAMPLES 130–159

Cementitious packaging materials were prepared using each of the compositions of Examples 100–129, except that fine mesh aluminum powder (14.3 g) and NaOH (31.9 g) were added to the compositions during the first mixing step. In all other respects the compositions were mixed together in the same manner.

The reaction of aluminum metal and hydroxyl ions formed fine bubbles of hydrogen gas, causing the cementitious mixtures to expand and become more lightweight. The final products formed therefrom were extremely lightweight and had up to 80% air voids by volume, but with sufficient strength for many containment applications. More aluminum powder and/or NaOH can be added to increase both the rate and volume of hydrogen gas formation, if desired.

Because hollow glass spheres were used instead of plastic balls, greater temperatures could be used during an expansion step since the glass will melt only at very high temperatures.

While the following examples are hypothetical in nature, they are based on similar mix designs which have either been made, or which were calculated and extrapolated from actual mixes. However, these examples are presented this way in order to more specifically teach those skilled in the art the compositions and methods of the present invention.

EXAMPLES 160–164

Cementitious packaging materials are prepared using each of the compositions of Examples 100–104, except that instead of hollow glass spheres, an equal volume of nefelin waste spheres (consisting of sodium silicate macrospheres) are used. In all other respects the compositions are mixed together in the same manner as in Examples 100–104. Because the nefelin waste spheres are not as lightweight as hollow glass spheres the resulting product is somewhat heavier. Nevertheless, this provides a method of recycling an extremely inexpensive waste product into a valuable material. In fact, nefelin macrospheres can be used instead of the inorganic aggregate material in any of the preceding examples.

The next set of examples shows two strategies for manufacturing containers which are very strong, tough, and durable, but which have one or more surfaces which are flexible and resilient.

EXAMPLE 165

Any two of the compositions set forth above are formed into layered sheets by molding together cementitious mixtures having differing characteristics. For example, a thin layer of an extremely tough material which might otherwise be brittle by itself because of its extreme thinness is sandwiched together with a thicker layer of an extremely lightweight material to form a tough and highly durable packaging material. The lightweight material may be a flexible material which contains plastic spheres. They are sandwiched together either during the green state, which causes them to cohere, or after they are cured by adhesive methods known in the art.

EXAMPLE 166

Cementitious containers are formed from any of the cementitious mixtures of Examples 40–49 except that the plastic balls are concentrated near the surface of the cementitious mixture in such a way that the molded or extruded materials contain a very high percentage of the plastic balls at or near the surfaces of the final cured containment product. The container formed thereby has a higher concentration of plastic balls near the surface of the cement matrix where flexibility is more important, and virtually no plastic balls in the center of the packaging material where flexibility is less important. The advantage of this is greater flexibility at the surfaces with the same amounts or less of plastic balls in the overall compositions. At the same time, the rigidity of the center of the container walls makes them as durable and tough as the more rigid containers above.

The next set of examples utilizes cementitious mixtures which have a relatively high specific gravity, but which are formed into solid objects, such as honeycomb structures, that have a high amount of intrastructural space. This reduces the bulk specific gravity of the final product so that it is more lightweight, yet very strong and durable.

EXAMPLE 167

A cementitious material is formed from a cementitious mixture which includes the following:

Portland White Cement 4.0 kg

Fine Sand 6.0 kg

Water 1.5 kg

Tylose® FL 15002 200 g

The cementitious mixture is formed by mixing the ingredients together for 10 minutes using a high speed mixer to obtain a very homogeneous mixture. The cementitious mixture is then extruded to form a honeycomb structure which has very high compressive strength. Because of the honeycomb structure, the cured material is very lightweight with a block density of only 1.02 g/cm$^3$. Moreover, the cured material has a compressive strength of about 75 MPa. Depending upon the amount of space within the honeycomb structure, the block density can easily range anywhere from between 0.5 to 1.6 g/cm$^3$.

These materials can be used to form very strong, yet lightweight walls of larger packaging containers.

EXAMPLES 168–170

Cementitious mixtures are formed according to Example 167, except that abaca fiber is added in varying amounts of 1%, 2%, and 3% by volume of the cementitious mixtures of Examples 168–170, respectively. The resulting honeycomb structures have greater strengths, both in the green state and after they are cured. The honeycomb structures formed in these examples are more ductile than in Example 167, while the compressive strengths would be expected to be even greater than in Example 167.

These materials can be used to form very strong, yet lightweight walls of larger packaging containers, but with greater strength than in Example 167.

EXAMPLES 171–173

Cementitious mixtures are formed according to Example 167, except that glass fiber is added in varying amounts of 1%, 2%, and 3% by volume of the cementitious mixtures in Examples 171–173, respectively. The resulting honeycomb structures have greater strengths, both in the green state and after they are cured. The honeycomb structures formed in these examples are more ductile than in Example 167, while the tensile strengths would be expected to also be greater.

These materials can be used to form very strong, yet lightweight walls of larger packaging containers, but with greater strength than in Example 167.

The next set of examples is directed to particular objects that can be molded from cementitious mixtures based on actual designs and objects which have been molded to date.

EXAMPLE 174

Using any of the foregoing compositions, the cementitious mixture is molded into the shape of a cup. Depending on the composition, the cup will exhibit high strength, durability, flexibility, low weight, and/or low density.

EXAMPLE 175

Using any of the foregoing compositions, the cementitious mixture is pressed into the shape of a carton. Depending on the composition, the carton will exhibit high strength, durability, flexibility, low weight, and/or low density.

EXAMPLE 176

Using any of the foregoing compositions, the cementitious mixture is molded into the shape of a crate. Depending on the composition, the crate will exhibit high strength, durability, flexibility, low weight, and/or low density.

EXAMPLE 177

Using any of the foregoing compositions, the cementitious mixture is molded into the shape of a lid. Depending on the composition, the lid will exhibit high strength, durability, flexibility, low weight, and/or low density.

EXAMPLE 178

Using any of the foregoing compositions, the cementitious mixture is molded into the shape of a partition. Depending on the composition, the partition will exhibit high strength, durability, flexibility, low weight, and/or low density.

EXAMPLE 179

Using any of the foregoing compositions, the cementitious mixture is molded into the shape of a liner. Depending on the composition, the liner will exhibit high strength, durability, flexibility, low weight, and/or low density.

EXAMPLE 180

Using any of the foregoing compositions, the cementitious mixture is molded into the shape of a box. Depending on the composition, the box will exhibit high strength, durability, flexibility, low weight, and/or low density.

EXAMPLE 181

Using any of the foregoing compositions, the cementitious mixture is blow molded into the shape of a bottle. Depending on the composition, the bottle will exhibit high strength, durability, flexibility, low weight, and/or low density.

EXAMPLE 182

Using any of the foregoing compositions, the cementitious mixture is blow molded into the shape of a spherical object. Depending on the composition, the spherical object will exhibit high strength, durability, flexibility, low weight, and/or low density.

EXAMPLE 183

Using any of the foregoing compositions, the cementitious mixture is molded into the shape of a utensil. Depending on the composition, the utensil will exhibit high strength, durability, flexibility, low weight, and/or low density.

The next set of examples is directed to a method of "dry molding" wherein the cementitious mixture is hydrated after the molding step in 100% relative humidity.

EXAMPLE 184

A cementitious packaging material is formed from a cementitious mixture which contains the following:

Portland White Cement 10.0 kg
Fine Sand 19.0 kg

The cementitious mixture is first dry compressed into the final form of the desired packaging container, such as a box, plate, carton, crate, utensil, handle, etc. at a pressure of from between 10,000 psi and 200,000 psi, and then cured in 100% relative humidity until hydrated. The final product is very strong and durable. This method allows the formation of packaging containers that for whatever reason might be difficult to form using wet cementitious mixtures. This method also allows the formation of containers that can readily be formed from wet cementitious mixtures as well.

EXAMPLES 185-189

Cementitious containers are formed according to the composition and method of Example 184, except that glass fiber is added in varying amounts of 2%, 4%, 6%, 8%, and 10% by volume of the cementitious mixtures of Examples 185-189, respectively. The containers formed therefrom have greater durability as the amount of glass fiber is increased. The aspect ratio of the glass fiber can be varied to yield products with varying strength and durability properties.

EXAMPLES 190-194

Cementitious containers are formed according to the composition and method of Example 184, except that abaca fiber is added in varying amounts of 2%, 4%, 6%, 8%, and 10% by volume of the cementitious mixtures of Examples 190-194, respectively. The containers formed therefrom have greater durability as the amount of abaca fiber is increased. The aspect ratio of the abaca fiber can be varied to yield products with varying strength and durability properties.

EXAMPLE 195-205

Using each of the compositions of Examples 184-194, the cementitious mixture is dry pressed into the shape of a cup, and then cured at 100% relative humidity. The resulting cup is very strong with a good surface.

EXAMPLES 206-216

Using each of the compositions of Examples 184-194, the cementitious mixture is dry pressed into the shape of a carton, and then cured at 100% relative humidity. The resulting carton is very strong with a good surface.

EXAMPLES 217-227

Using each of the compositions of Examples 184-194, the cementitious mixture is dry pressed into the shape of a crate, and then cured at 100% relative humidity. The resulting crate is very strong with a good surface.

EXAMPLES 228-238

Using each of the compositions of Examples 184-194, the cementitious mixture is dry pressed into the shape of a lid, and then cured at 100% relative humidity. The resulting lid is very strong with a good surface.

EXAMPLES 239-249

Using each of the compositions of Examples 184-194, the cementitious mixture is dry pressed into the shape of a partition, and then cured at 100% relative humidity. The resulting partition is very strong with a good surface.

EXAMPLES 250-260

Using the compositions of Examples 184-194, the cementitious mixture is dry pressed into the shape of a liner, and then cured at 100% relative humidity. The resulting liner is very strong with a good surface.

EXAMPLES 261-271

Using the compositions of Examples 184-194, the cementitious mixture is dry pressed into the shape of a box, and then cured at 100% relative humidity. The resulting box is very strong with a good surface.

EXAMPLES 272-282

Using the compositions of Examples 184-194, the cementitious mixture is dry pressed into the shape of a bottle, and then cured at 100% relative humidity. The resulting bottle is very strong with a good surface.

EXAMPLES 283-293

Using the compositions of Examples 184-194, the cementitious mixture is dry pressed into the shape of a spherical object, and then cured at 100% relative humidity. The resulting spherical object is very strong with a good surface.

EXAMPLES 294-304

Using the compositions of Examples 184-194, the cementitious mixture is dry pressed into the shape of a utensil, and then cured at 100% relative humidity. The resulting utensil is very strong with a good surface.

The following examples have been made and are generally the preferred mix designs for the objects listed below based on the information gained from the preceding examples.

EXAMPLES 305-308

The cementitious mixture of Example 10 was altered by adding varying amounts of abaca fiber as follows:

| Example | Abaca Fiber |
| --- | --- |
| 305 | 200 g |
| 306 | 250 g |
| 307 | 300 g |
| 308 | 350 g |

The resultant percentages by weight of the added abaca fiber in these examples were 5.3%, 6.6%, 7.8%, and 9.0%.

The cementitious mixtures were extruded and then passed between and pair of rollers to form thin sheets having a thickness of between 0.2 mm to 2 mm. As more fiber was added, the cured cementitious sheets had greater flexibility and toughness, which made them more suitable for making a fold or bend in the material. The added fibers make the cured sheets suitable to make a hinge upon which the sheets may be folded.

EXAMPLES 309–312

Cementitious mixtures were made which contained the following components:

| Example | Cement | Water | Tylose ® | Abaca Fiber |
| --- | --- | --- | --- | --- |
| 309 | 0.75 kg | 2.0 kg | 100 g | 260 g |
| 310 | 1.5 kg | 2.0 kg | 100 g | 260 g |
| 311 | 3.0 kg | 2.0 kg | 100 g | 260 g |
| 312 | 6.0 kg | 2.0 kg | 100 g | 260 g |

Tylose® FL 15002 was used. The cementitious mixtures were mixed in a high energy mixer for 5 minutes, extruded, and then passed through a pair of rollers to form sheets having thicknesses ranging from 0.2 mm to 1.5 mm. As less cement was included, the effective amount of fiber increased, making the final product more ductile, tough, and less brittle.

The cementitious mixture of Example 310 was rolled onto a spool much like paper and could be used thereafter much like paper. For example, the rolled paper was later formed into a variety of objects, including a box, french fry carton, or cup. In order to fold the sheet it was preferable to score it first and then fold the sheet along the score. However, for the cup, the material could simply be rolled into a cup without folding or scoring.

In addition, one of the cementitious sheets was fed through a laser printer and successfully received the printed characters. This demonstrates that the cementitious sheets made according to the present invention behave very similarly in many respects to actual paper made from wood pulp.

EXAMPLES 313–314

The cementitious mixture of Example 310 was altered to instead contain either 150 g or 200 g of Tylose® FL 15002. By adding more Tylose®, the resulting cementitious mixture had more plasticity. The mixtures of Examples 313–314 were molded and shaped into the same objects as those in Example 310.

EXAMPLES 315–320

Using the cementitious mixtures of Examples 309–314, extruded sheets with internal honeycomb structures were made. The thicknesses of the individual walls within the honeycomb structure were as thin as 0.5 mm, but most often about 1 mm. The size of the spaces, or cells, between the walls are determined by the size of the die, but were typically between about 1–9 mm². The resulting sheets were extremely strong due to the honeycomb structure and can be used in making containers, or they can be used to reinforce the junctions between the walls of a container. Depending on the strength desired, there can be 2 or more layers of honeycomb structure through a perpendicular cross-section of the sheet.

EXAMPLE 321

A cementitious mixture was prepared which had the following components:

Portland Cement 1.0 kg

Water 2.3 kg

Tylose® FL 15002 200 g

Abaca Fiber 250 g

Perlite 1.1 kg

The cement, water, Tylose®, and abaca fiber were mixed together in a high speed, high shear mixer for five minutes. Thereafter, the perlite was added to the mixture, which was mixed under low speed mixing conditions for five minutes. The cementitious mixture was made into thin sheets of 1 mm or less by first extruding, and then passing through a pair of rollers, the cementitious mixture. Some of the thin sheets were formed into the shape of a box before hardening.

Other of the sheets were scored and allowed to cure before they were formed into the shape of a box. The sheets were readily bent along the line where the sheet was scored. The walls of the box were glued together using adhesion methods known to those skilled in the art. Where the walls were not glued together, such as in the case of a flap or other enclosure means, the fiber provided adequate strength properties so that the flaps could repeatedly bend along the hinge without breaking.

Finally, yet other of the sheets were allowed to dry and were then rolled into the shape of a cup. Each of the containers formed in this example had adequate durability for their intended use. Because of the use of a relatively large amount of perlite, the containers made in this example were extremely inexpensive compared to containers of previous examples that used more expensive aggregate materials. Although the inclusion of perlite generally yields a final product that is often weaker than containers made from other aggregates, in many cases the lower cost far outweighs the loss of any strength characteristic.

The main concern is the intended use of the container to be manufactured. While the use of a large amount of perlite tends to decrease the compressive strength of the final product, and to some extent the tensile strength, the inclusion of a relatively large amount of abaca fiber increases the tensile strength and the fracture energy of the final product. Thus, the amount of perlite and abaca fiber can be modified to obtain the optimum cost and strength characteristics, although this would certainly be true for any added aggregate.

EXAMPLE 322

The cementitious mixture of Example 321 was instead spread into a mold and formed into plate with a thickness of 4 mm. After curing, the plates had high strength and insulation characteristics. In addition, a cured plate was thereafter stamped to form a permanent impression on the surface. This was possible due to the softness of the aggregate, in this case perlite, which is broken and densified during the stamping process.

In this way, containers having a wide variety of shapes and utilities can be formed, greatly simplifying the molding process. For example, lids, disposable and nondisposable dinner plates, TV-dinner trays, picnic plates, compartmentalized trays and plates, and other specially shaped objects can be stamped out of simple, flat cementitious sheets made according to the present invention.

EXAMPLE 323

The cementitious mixture of Example 321 was altered to contain 500 g of abaca fiber and formed into the same objects as in Examples 321 and 322. The final cured product of this example had greater fracture energy, toughness, and tensile strength. In addition, the hinges formed within the containers were more durable and were better able to resist cracking or fracturing due to the stresses applied in bending the flaps along the hinge.

EXAMPLES 324-327

The cementitious mixture of Example 321 was altered to contain the following amounts of Tylose® FL 15002:

| Example | Tylose® |
|---------|---------|
| 324 | 50 g |
| 325 | 100 g |
| 326 | 150 g |
| 327 | 200 g |

The cementitious mixtures formed in these examples showed a decrease in plasticity as less Tylose® was added. Nevertheless, the cementitious mixtures were formed into thin sheets by extruding and passing through a pair of rollers the cementitious mixtures. In addition, the cementitious mixtures were formed into thicker sheets using a mold.

Plasticity of the cementitious mixture is generally less important where simple objects are being molded, such as flat cementitious sheets. In addition, once the cementitious mixture cures, the effect of Tylose® is diminished, which is generally to impart form stability to the molded object. The need for Tylose® in creating form stability is greatly diminished where, as here, the molded product is a flat sheet and becomes form stable by being exposed to heat, such as by using heated rollers and/or passing the sheet through a heat tunnel.

While using more Tylose® in these situations certainly does not diminish the quality of the final product, the high cost of Tylose® relative to the other ingredients might warrant a reduction of the amount of Tylose® or other rheology modifying agent being used for a given application. The decision of how much Tylose® or other rheology modifying agent to use will depend on the molding process, the shape of the final product, and the cost restraints of the object being made.

EXAMPLES 328-331

The cementitious mixture of Example 321 was altered to contain the following amounts of abaca fiber:

| Example | Abaca Fiber |
|---------|-------------|
| 328 | 32 g |
| 329 | 50 g |
| 330 | 100 g |
| 331 | 150 g |
| 332 | 200 g |

The cementitious mixtures were mixed and molded into containers as in Examples and 322. However, as less abaca fiber was used, the fracture energy and toughness of the final product decreased. Nevertheless, in cases where such qualities are less important it may be advantageous to use less abaca fiber, which is more expensive than other ingredients such as cement, water, and aggregates such as perlite.

While the following example is hypothetical in nature, it is based on manufacturing processes which have actually been carried out. However, it is presented in this way to better teach one skilled in the art the scope and versatility of the present invention.

EXAMPLE 333

Using the cementitious mixture described in Example 321, corrugated cementitious sheets containing a fluted inner structure sandwiched between two flat sheets are formed. The flat outer sheets are formed, as above, by first extruding, and then passing between a pair of rollers, the cementitious mixture. The outer sheets have a thickness of about 1 min.

The corrugated, or fluted inner sheet (which is similar to the fluted or corrugated inner sheet of an ordinary cardboard box) is formed by passing a semi-hardened flat sheet through a pair of rollers with intermeshing corrugated surfaces or teeth. The manufacturing process is preferably carried out in one continuous process wherein the newly formed flat sheet is immediately passed through a heat runnel adjusted to create the optimal amount of hardening and then passed through the corrugated rollers. The corrugated rollers force the thin cementitious sheet into the fluted or corrugated shape. The corrugated sheet is then passed through a heat tunnel to help it maintain its shape.

Glue is applied to the outer edges of the individual folds of the corrugated sheet by passing the corrugated sheet through a pair of glue covered rollers adequately spaced to apply the glue without destroying the corrugations. Alternatively, the glue can be applied by spraying glue onto the edges of the corrugated sheet. The corrugated sheet is then sandwiched between the two outer sheets and the combination allowed to harden.

IV. Summary.

From the foregoing, it will be appreciated that the present invention provides novel compositions and processes for cementitious containers for the storing, dispensing, packaging, portioning, or shipping of goods or apparatus. The cementitious containers or materials formed thereby can take the place of almost any containment product or accessory now produced from paper, plastic, or polystyrene.

The present invention also provides novel compositions and processes for cementitious containers which have insulating and other properties comparable to that of polystyrene foam containers, but which are more environmentally neutral. Specifically, containers made according to the present invention do not require the use of, or emit, chemicals which have been implicated as causing depletion of the ozone layer, nor do they create unsightly garbage which does not degrade, or which only very slowly degrades over time in landfills.

In addition, the present invention also provides novel compositions and processes for cementitious containers which can be produced at relatively low cost.

Further, the present invention provides novel compositions and processes for cementitious containers which are tough, durable, flexible, and disposable, but which are much more environmentally sound in their disposal than other disposable containers, such as paper, plastic and styrofoam. The present invention provides novel compositions and processes for cementitious containers which are essentially comprised of the same compounds as the earth, and are similar to dirt and rock, and therefore pose little or no risk to the environment when discarded.

The present invention further provides novel compositions and processes for which the raw materials may be obtained from the earth, eliminating the need to cut down large numbers of trees in order to create the starting raw materials, as is required for the manufacture of paper containers.

The present invention further provides novel compositions and processes for improving the safety of storage and dispensing containers, in that cementitious containers do not release harmful chemicals like dioxin or CFC's into the goods therein, nor are dioxins produced during the manufacture of such containers.

The present invention further provides novel compositions and processes for improving the recyclability of disposable containers, particularly since the cementitious materials can be reintroduced into new cement paste as an aggregate, or be incorporated as a suitable aggregate in many cement applications.

The present invention further provides novel compositions and processes for achieving lightweight containers which still give sufficient structural support for the goods or apparatus stored therein.

The present invention further provides novel cementitious packaging containers which will maintain their shape without external support during the green state and rapidly achieve sufficient strength so that the molded containers can be handled using ordinary methods.

The present invention may be embodied in other specific forms without departing from its spirit or essential characteristics. The described embodiments are to be considered in all respects as illustrative only, and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture for storing, dispensing, packaging, portioning, or shipping comprising a container, at least a substantial portion of said container being formed from a cementitious mixture comprising a hydraulic cement, fibers and water, the fibers having a minimum concentration of about 5% by weight of the cementitious mixture, the cementitious mixture forming a cementitious structural matrix having a maximum thickness of about 2 cm, wherein the fibers are substantially homogeneously dispersed throughout the cementitious structural matrix such that the structural matrix is sufficiently flexible that it may be significantly mechanically deformed without complete rupture of the structural matrix.

2. An article of manufacture as defined in claim 1, the cementitious structural matrix having a maximum thickness of about 1 cm.

3. An article of manufacture as defined in claim 1, the cementitious structural matrix having a maximum thickness of about 3 mm.

4. An article of manufacture as defined in claim 1, the cementitious structural matrix having a maximum thickness of about 1 mm.

5. An article of manufacture as defined in claim 1, wherein the cementitious structural matrix has a strength to density ratio within the range from about 0.5 MPa-cm$^3$/g to about 50 MPa-cm$^3$/g.

6. An article of manufacture as defined in claim 1, wherein the hydraulic cement is a portland cement.

7. An article of manufacture as defined in claim 1, wherein the hydraulic cement is a microfine cement.

8. An article of manufacture as defined in claim 1, wherein the hydraulic cement is selected from the group consisting of slag cement, calcium aluminate cement, plaster, silicate cement, gypsum cement, phosphate cement, white cement, high-alumina cement, magnesium oxychloride cement, aggregates coated with microfine cement particles, and mixtures of the foregoing.

9. An article of manufacture as defined in claim 1, wherein the cementitious mixture has a water to hydraulic cement ratio in the range of from about 0.1:1 to about 10:1.

10. An article of manufacture as defined in claim 1, said cementitious mixture further including an aggregate material.

11. An article of manufacture as defined in claim 10, wherein the aggregate material is selected from the group consisting of perlite, vermiculite, exfoliated rock, hollow glass spheres, sodium silicate macrospheres, lightweight concrete, porous ceramic spheres, tabular alumina, aerogel, lightweight expanded clay, expanded fly ash, expanded slag, pumice, and mixtures thereof.

12. An article of manufacture as defined in claim 10, wherein the aggregate material is selected from the group consisting of metals, polymers, ceramic, alumina, and cork.

13. An article of manufacture as defined in claim 10, wherein the aggregate material is selected from the group consisting of clay, sand, gravel, rock, limestone, calcium carbonate, sandstone, gypsum, alumina, silica, ground quartz, and mixtures thereof.

14. An article of manufacture as defined in claim 10, wherein the aggregate material comprises particles of a polymeric material, wherein the cementitious structural matrix has a surface and a center, and wherein said particles are more concentrated near the surface of the cementitious structural matrix than near the center.

15. An article of manufacture as defined in claim 10, wherein the aggregate material is selected from the group consisting of seeds, granulated starches, gelatins, solid agar materials, and mixtures or derivatives thereof.

16. An article of manufacture as defined in claim 10, wherein the aggregate material has a concentration up to about 90% by weight of the cementitious mixture.

17. An article of manufacture as defined in claim 10, wherein aggregate material has a concentration in a range from about 1% to about 60% by weight of the cementitious mixture.

18. An article of manufacture as defined in claim 10, wherein said aggregate material has a concentration in a range from about 20% to about 50% by weight of the cementitious mixture.

19. An article of manufacture as defined in claim 1, wherein the cementitious structural matrix further includes at least one aggregate material which increases the insulation ability of the container.

20. An article of manufacture as defined in claim 1, wherein the fibers are selected from the group consisting of abaca, glass, cellulose, hemp, metal, ceramic, and silica fibers, and mixtures thereof.

21. An article of manufacture as defined in claim 1, wherein the fibers have an aspect ratio of at least about 10:1.

22. An article of manufacture as defined in claim 1, wherein the fibers have a concentration from about 5% to about 20% by volume of the cementitious mixture.

23. An article of manufacture as defined in claim 1, wherein the cementitious mixture further includes a rheology-modifying agent which increases the plastic characteristics of the cementitious mixture during a molding process and imparts form stability to the cementitious structural matrix after molding.

24. An article of manufacture as defined in claim 23, wherein the rheology-modifying agent includes a cellulosic material.

25. An article of manufacture as defined in claim 24, wherein the cellulosic material is selected from the group consisting of methylhydroxyethylcellulose, hydroxymethylethylcellulose, methylcellulose, hydroxyethylcellulose, carboxymethylcellulose, ethylcellulose, hydroxyethylpropylcellulose, and mixtures or derivatives thereof.

26. An article of manufacture as defined in claim 23, wherein the rheology-modifying agent includes a starch or a derivative thereof.

27. An article of manufacture as defined in claim 26, wherein the starch or derivative thereof is selected from the group consisting of amylopectin, amylose, sea-gel, starch acetates, starch hydroxyethyl ethers, ionic starches, long-chain alkyl starches, dextrins, amine starches, phosphate starches, dialdehyde starches, and mixtures or derivatives thereof.

28. An article of manufacture as defined in claim 23, wherein the rheology-modifying agent includes a polysaccharide selected from the group consisting of alginic acid, phycocolloids, agar, gum arabic, guar gum, locust bean gum, gum karaya, gum tragacanth, and mixtures or derivatives thereof.

29. An article of manufacture as defined in claim 23, wherein the rheology-modifying agent includes a protein or a derivative thereof.

30. An article of manufacture as defined in claim 29, wherein the protein or derivative thereof is selected from the group consisting of prolamine, gelatin, glue, casein, and mixtures or derivatives thereof.

31. An article of manufacture as defined in claim 23, wherein the rheology-modifying agent comprises a synthetic organic material selected from the group consisting of polyvinyl alcohol, polyvinyl pyrrolidone, polyvinylmethyl ether, polyacrylic acids, polyacrylic acid salts, polyvinylacrylic acids, polyvinylacrylic acid salts, polyacrylimides, synthetic clay, latex, ethylene oxide polymers, and mixtures thereof.

32. An article of manufacture as defined in claim 23, wherein the rheology-modifying agent has a concentration in a range from about 0.2% to about 10% by volume of the cementitious mixture.

33. An article of manufacture as defined in claim 23, wherein the rheology-modifying agent has a concentration in a range from about 0.5% to about 5% by volume of the cementitious mixture.

34. An article of manufacture as defined in claim 1, wherein the cementitious mixture further includes means for creating a discontinuous phase of finely dispersed, nonagglommerated voids within the cementitious structural matrix.

35. An article of manufacture as defined in claim 34, wherein the means for creating a discontinuous phase of finely dispersed, nonagglommerated voids within the cementitious structural matrix includes an air entraining agent.

36. An article of manufacture as defined in claim 34, the cementitious mixture further including an stabilizing agent for retaining the finely dispersed air voids within the cementitious mixture as it forms the cementitious structural matrix.

37. An article of manufacture as defined in claim 34, wherein the means for creating a discontinuous phase of finely dispersed, nonagglommerated voids within the cementitious structural matrix includes a metal which reacts with basic components in the cementitious mixture to produce a gas in order to incorporate voids into the cementitious structural matrix.

38. An article of manufacture as defined in claim 1, wherein the cementitious structural matrix further includes a discontinuous, nonagglommerated phase including finely dispersed voids.

39. An article of manufacture as defined in claim 1, further including a coating on at least a portion of the surface of the cementitious structural matrix.

40. An article of manufacture as defined in claim 39, wherein the coating on at least a portion of the surface of the cementitious structural matrix prevents leaching of any material into or out of the cementitious structural matrix.

41. An article of manufacture as defined in claim 39, wherein the coating on at least a portion of the surface of the cementitious structural matrix of the container renders such portion waterproof.

42. An article of manufacture as defined in claim 39, wherein the coating is selected from the group consisting of melamine, prolamine, polyvinyl chloride, polyvinyl alcohol, polyvinyl acetate, sodium silicate, calcium carbonate, polyacrylate, and a ceramic.

43. An article of manufacture as defined in claim 1, wherein the container is in the shape of a box.

44. An article of manufacture as defined in claim 1, wherein the container is suitable for holding a food or beverage product.

45. An article of manufacture as defined in claim 1, wherein the container includes a plurality of cementitious walls defining an interior and an opening which permits access to the interior.

46. An article of manufacture as defined in claim 45, wherein the container further includes at least one cementitious flap that is hingedly attached to a cementitious wall and selectively able to at least partially cover the opening.

47. An article of manufacture as defined in claim 45, wherein the container further includes a removable cementitious enclosure that is selectively able to at least partially cover the opening.

48. An article of manufacture defining claim 47, wherein the removable cementitious enclosure is removed by at least partially deforming a portion of the cementitious structural matrix of the container.

49. An article of manufacture as defined in claim 1, wherein the container further includes cementitious partitions.

50. An article of manufacture as defined in claim 1, wherein the container is in the shape of a cup.

51. An article of manufacture as defined in claim 1, wherein the container is in the shape of a plate.

52. An article of manufacture as defined in claim 1, wherein the container is in the shape of a tray.

53. An article of manufacture as defined in claim 1, wherein the container is in the shape of a clam shell container.

54. An article of manufacture as defined in claim 1, wherein the container is in the shape of a carton.

55. An article of manufacture as defined in claim 1, wherein the container is in the shape of an envelope.

56. An article of manufacture as defined in claim 1, wherein the container is in the shape of a bottle.

57. An article of manufacture as defined in claim 1, wherein the container is in the shape of a can.

58. An article of manufacture as defined in claim 1, wherein the structural matrix comprises a corrugated cementitious sheet sandwiched between two sheets having generally smooth surfaces.

59. An article of manufacture as defined in claim 1, wherein the hydraulic cement has a concentration in a range from about 5% to about 90% by weight of the cementitious mixture.

60. An article of manufacture as defined in claim 1, wherein the hydraulic cement has a concentration in a range from about 5% to about 60% by weight of the cementitious mixture.

61. An article of manufacture as defined in claim 1, wherein the cementitious structural matrix further includes means for restraining the movement of an object within the container.

62. An article of manufacture as defined in claim 1, wherein the cementitious structural matrix further includes means for cushioning an object within the container.

63. An article of manufacture as defined in claim 1, wherein the cementitious structural matrix further includes means for preventing an object within the container from being crushed.

64. A cementitious container formed from a cementitious mixture comprising hydraulic cement, a rheology-modifying agent, and water, the cementitious mixture forming a cementitious structural matrix, wherein the container includes an opening and at least one cementitious flap that is hingedly attached to a cementitious wall and selectively able to at least partially cover the opening, the cementitious structural matrix having a maximum density of about 1.6 g/cm$^3$.

65. A cementitious container as defined in claim 64, wherein the cementitious structural matrix has a thickness less than about 3 mm.

66. A cementitious container as defined in claim 64, wherein the cementitious structural matrix has a thickness less than about 1 mm.

67. A cementitious container as defined in claim 64, wherein the attachment between the cementitious flap and the cementitious wall comprises a laminated cementitious structural matrix.

68. A cementitious container as defined in claim 64, further including a liner within the container.

69. A cementitious container as defined in claim 64, wherein the cementitious mixture includes fibers in a concentration greater than about 5% by weight of the cementitious mixture.

70. An article of manufacture comprising a container formed from a cementitious mixture comprising hydraulic cement, a rheology-modifying agent, fibers and water which harden to form a cementitious structural matrix having a density of less than about 1.6 g/cm$^3$ and a thickness less than about 2 cm, wherein the fibers are substantially homogeneously dispersed throughout the cementitious structural matrix such that the structural matrix can be at least partially deflected or bent to significantly mechanically deform the matrix without complete fracture of the cementitious structural matrix.

71. An article of manufacture as defined in claim 70, wherein the cementitious structural matrix has a thickness less than about 3 mm.

72. An article of manufacture as defined in claim 70, wherein the cementitious structural matrix has a thickness less than about 1 mm.

73. An article of manufacture as defined in claim 70, wherein the cementitious structural matrix further includes a coating thereon.

74. An article of manufacture as defined in claim 70, wherein the cementitious mixture further includes fibers in a concentration greater than about 5% by weight of the cementitious mixture.

* * * * *

UNITED STATES PATENT AND TRADEMARK OFFICE
CERTIFICATE OF CORRECTION

PATENT NO. : 5,654,048

DATED : August 5, 1997

INVENTOR(S) : Per Just Andersen; Simon K. Hodson

It is certified that error appears in the above-identified patent and that said Letters Patent is hereby corrected as shown below:

Title Page, Foreign Patent Documents, line 3, Argentina 241781, "12/1993" should be --12/1992--

Title Page, Other Publications, line 22, "Anderson" should be --Andersen--

Page 2, Right Column, line 34, "Toffolorn" should be --Toffolom--

Page 4, Other Publications, Left Column, line 22, "Furne" should be --Fume--

Page 4, Right Column, line 8, "ans" should be --and--

Page 5, Right Column, line 27, "836-437" should be --836-837--

Page 6, Left Column, line 6, "TT-Projekt" should be --TR-Projekt--

Page 6, Left Column, after line 7 insert --English Translation - Strabo, et al., Cement-Based Hybrid Composites, Technological Institute of Denmark, Department of Building Technology, TR-Project 1985-133/177-85.533 (1987).

Page 6, Right Column, line 32, "nr," should be --nr.--

Col. 3, line 10, "ream" should be --return--

Col. 13, line 19, "cover" should be --covers--

Col. 13, line 29, "preferably," should be --preferably--

Col. 13, line 54, "a aspect" should be --an aspect--

UNITED STATES PATENT AND TRADEMARK OFFICE
CERTIFICATE OF CORRECTION

PATENT NO. : 5,654,048
DATED : August 5, 1997
INVENTOR(S) : Per Just Andersen; Simon K. Hodson It is certified that error appears in the above-identified patent and that said Letters Patent is hereby corrected as shown below:

Col. 16, line 29, delete "(emphasis added)"

Col. 17, line 28, "bails" should be --balls--

Col. 20, line 53, "mounts" should be --amounts--

Col. 21, line 64, "has" should be --have--

Col. 21, line 65, "capability" should be --capabilities--

Col. 22, line 65, "wails" should be --walls--

Col. 23, line 30, "mount" should be --amount--

Col. 25, line 41, "mm" should be --turn--

Col. 33, line 21, "bails" should be --balls--

Col. 40, line 16, "min." should be --mm.--

UNITED STATES PATENT AND TRADEMARK OFFICE
CERTIFICATE OF CORRECTION

PATENT NO. : 5,654,048

DATED : August 5, 1997

INVENTOR(S) : Per Just Andersen; Simon K. Hodson

It is certified that error appears in the above-identified patent and that said Letters Patent is hereby corrected as shown below:

Col. 50, line 10, "min." should be --mm.--

Col. 50, line 17, "runnel" should be --tunnel--

Col. 53, line 54, "an stabilizing" should be --a stabilizing--

Signed and Sealed this

Thirty-first Day of March, 1998

Attest:

BRUCE LEHMAN

Attesting Officer

Commissioner of Patents and Trademarks